United States Patent
Wu et al.

(10) Patent No.: US 9,949,284 B2
(45) Date of Patent: Apr. 17, 2018

(54) METHODS FOR DETERMINING SIGNALING TIMING AND SCHEDULING TIMING IN DETERMINING UPLINK AND DOWNLINK RECONFIGURATION, AND USER EQUIPMENT

(71) Applicant: MediaTek Singapore Pte. Ltd., Singapore (SG)

(72) Inventors: Min Wu, Beijing (CN); Chien-Hwa Hwang, Zhubei (TW)

(73) Assignee: MEDIATEK SINGAPORE PTE. LTD., Sinagpore (SG)

(*) Notice: Subject to any disclaimer, the term of this patent is extended or adjusted under 35 U.S.C. 154(b) by 300 days.

(21) Appl. No.: 14/761,730

(22) PCT Filed: Jan. 17, 2014

(86) PCT No.: PCT/CN2014/070815
§ 371 (c)(1),
(2) Date: Jul. 17, 2015

(87) PCT Pub. No.: WO2014/111045
PCT Pub. Date: Jul. 24, 2014

(65) Prior Publication Data
US 2015/0365965 A1 Dec. 17, 2015

(30) Foreign Application Priority Data
Jan. 18, 2013 (CN) .......................... 2013 1 0018416

(51) Int. Cl.
*H04W 72/12* (2009.01)
*H04W 72/04* (2009.01)
(Continued)

(52) U.S. Cl.
CPC ....... *H04W 72/1268* (2013.01); *H04L 1/1812* (2013.01); *H04L 1/1854* (2013.01);
(Continued)

(58) Field of Classification Search
CPC ..... H04L 1/1812; H04L 5/1469; H04L 5/143; H04L 1/1854; H04W 72/12; H04W 72/1268; H04W 72/04; H04W 24/02
(Continued)

(56) References Cited

U.S. PATENT DOCUMENTS

2011/0035639 A1* 2/2011 Earnshaw ............. H04L 1/1812
714/748
2013/0194980 A1* 8/2013 Yin ....................... H04L 1/1607
370/280

(Continued)

FOREIGN PATENT DOCUMENTS

CN 101860898 A 10/2010
CN 102255718 A 11/2011
(Continued)

OTHER PUBLICATIONS

International Search Report dated Apr. 3, 2014, issued in application No. PCT/CN2014/070815.

*Primary Examiner* — Jae Y Lee
*Assistant Examiner* — Jean F Voltaire
(74) *Attorney, Agent, or Firm* — McClure, Qualey & Rodack, LLP

(57) ABSTRACT

The present invention provides a method for determining HARQ-ACK feedback timing and uplink scheduling timing, and for managing the synchronous uplink HARQ process during uplink and downlink reconfiguration. The method comprises: when uplink and downlink reconfiguration is performed, determining whether at least one HARQ-ACK feedback associated with the last frame of a previous uplink and downlink configuration cannot be transmitted in the first frame of a current uplink and downlink configuration; and when the HARQ-ACK feedback cannot be transmitted in the first frame of the current uplink and downlink configuration,
(Continued)

the HARQ-ACK feedback follows a new timing determined by the previous and the current uplink and downlink configuration.

23 Claims, 11 Drawing Sheets

(51) Int. Cl.
*H04W 24/02* (2009.01)
*H04L 1/18* (2006.01)
*H04L 5/14* (2006.01)
*H04L 5/00* (2006.01)

(52) U.S. Cl.
CPC .............. *H04L 5/0055* (2013.01); *H04L 5/143* (2013.01); *H04W 24/02* (2013.01); *H04W 72/04* (2013.01); *H04W 72/12* (2013.01); *H04L 5/001* (2013.01); *H04L 5/1469* (2013.01)

(58) Field of Classification Search
USPC .......................................................... 370/328
See application file for complete search history.

(56) References Cited

U.S. PATENT DOCUMENTS

| | | | |
|---|---|---|---|
| 2013/0301490 A1* | 11/2013 | He | H04W 76/048 370/280 |
| 2014/0022960 A1* | 1/2014 | Fu | H04W 24/02 370/280 |
| 2014/0140251 A1 | 5/2014 | Pan et al. | |
| 2014/0241318 A1 | 8/2014 | Zhong et al. | |
| 2015/0295683 A1* | 10/2015 | Horiuchi | H04L 1/189 370/328 |

FOREIGN PATENT DOCUMENTS

| | | |
|---|---|---|
| CN | 102271034 A | 12/2011 |
| CN | 102511189 A | 6/2012 |
| CN | 102752862 A | 10/2012 |

* cited by examiner

METHODS FOR DETERMINING SIGNALING TIMING AND SCHEDULING TIMING IN DETERMINING UPLINK AND DOWNLINK RECONFIGURATION, AND USER EQUIPMENT

CROSS REFERENCE TO RELATED APPLICATIONS

The present invention is a National Stage Application of PCT Application Ser. No. PCT/CN2014/070815, filed on Jan. 17, 2014, which claims priority to Chinese reference no. CN 201310018416.1, filed on Jan. 18, 2013. The priority applications are hereby incorporated by reference in their entireties.

BACKGROUND OF THE INVENTION

Field of the Invention

Aspects of the present invention relate generally to wireless communications network technologies, and more particularly, to processes for managing the hybrid automatic repeat request (HARQ) process when the uplink and downlink configuration is changed in a Time-Division Duplex (TDD) system.

Description of the Related Art

In the 3GPP (Third-Generation Partnership) LTE (Long Term Evolution) system, a HARQ mechanism is used to improve the reliability of uplink and downlink data transmission. A DL HARQ is an asynchronous adaptive HARQ, and a UL HARQ is a synchronous adaptive or non-adaptive HARQ. The adaptive HARQ is a modulation and code scheme (MCS) of the retransmission data and allocated physical resources can be changed with the channel state information (CSI). Synchronous HARQ means that the interval between the first transmission and a retransmission is a fixed time. Compared with the traditional stop-and-wait ARQ mechanism, the LTE system can support multiple parallel HARQ processes. For the asynchronous DL HARQ, the ID of a user equipment (UE) DL HARQ process should be informed in downlink control information (DCI). The UE can correctly combine the retransmission data with the first transmission data. The interval between the first transmission and the retransmission of the DL HARQ is not fixed, but the interval between the DL HARQ-ACK and the corresponding physical downlink shared channel (PDSCH) should follow a fixed interval. For the synchronized UL HARQ, it is unnecessary to indicate the ID of the UL HARQ process. The interval between the first transmission and the retransmission of the UL HARQ is fixed. Besides, the interval between the UL HARQ-ACK and the corresponding physical uplink shared channel (PUSCH) should follow a fixed interval. An uplink scheduling signaling comprises a UL grant and a physical HARQ indicator channel (PHICH), wherein the UL grant can be used to schedule new data transmission and adaptive/non-adaptive HARQ retransmission, and the PHICH only can be used to schedule the non-adaptive HARQ retransmission. In the FDD LTE system, the uplink and downlink only can support eight parallel HARQ processes, and there is only a HARQ-ACK/uplink scheduling timing. The HARQ-ACK is fed back after 4 ms after the data is received, and the uplink scheduling signaling is transmitted prior to 4 ms before the uplink data is transmitted. In the TD-LTE system, a maximum number of HARQ processes is related to the UL-DL configuration. When the ratio of the UL subframe in a radio frame is increased, the number of UL HARQ process will be increased, and the number of DL HARQ processes will be reduced. There are corresponding HARQ-ACK feedback timing and uplink scheduling timing for each UL-DL configuration.

However, following the existing HARQ-ACK feedback timing and uplink scheduling timing will have some problems when the UL-DL configuration is changed.

BRIEF SUMMARY OF THE INVENTION

Methods for determining HARQ-ACK feedback timing and uplink scheduling timing during uplink and downlink reconfiguration, and methods managing synchronous HARQ processes are provided.

A method for determining a HARQ-ACK feedback timing and a scheduling timing during UL-DL reconfiguration is provided in one embodiment of the invention. The method comprising: using, by a user equipment (UE), a first timing set for a HARQ-ACK feedback timing and a UL scheduling timing of a first frame of a current UL-DL configuration during the UL-DL reconfiguration; and the UE using a second timing set for a HARQ-ACK feedback timing and a UL scheduling timing of a second frame and subsequent frames of the current UL-DL configuration.

A user equipment (UE) for managing an ACK signaling timing of an UL-DL configuration is provided in one embodiment of the invention. The user equipment comprises a plurality of buffers, a timing decision module and an ACK signaling transmission module. A plurality of buffers buffer a first transmission and retransmission of a physical shared data. When uplink-downlink (UL-DL) configuration is reconfigured, the timing decision module uses a first timing table for the ACK signaling scheduling timing of a physical shared data channel transmitted in a first frame of a current UL-DL configuration, and uses a second timing table for ACK signaling scheduling timing of a second frame and subsequent frames of the current UL-DL configuration. The ACK signaling transmission module transmits the ACK signaling to confirm the transmission and retransmission corresponding to the physical shared data according to the corresponding timing table.

A method for managing a plurality of synchronous uplink HARQ processes is provided in one embodiment of the invention. The method is used during the UL-DL reconfiguration in a time division duplex system. The method comprises: starting a number of HARQ processes when a number of HARQ processes of the current UL-DL configuration is larger than a number of HARQ processes of a previous UL-DL configuration a first number, wherein the number of started HARQ processes is at least equal to the first number; terminating the number of HARQ processes when the number of HARQ processes of the current UL-DL configuration is less than the number of HARQ processes of the previous UL-DL configuration a second number, wherein the number of terminated HARQ processes is at least equal to the second number; and terminating a UL HARQ process and starting another UL HARQ process when the UL HARQ process cannot maintain continuous operation during the UL-DL reconfiguration.

A detailed description is given in the following embodiments with reference to the accompanying drawings.

DETAILED DESCRIPTION OF THE INVENTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections. The following description is of the best-contemplated mode of carrying out the invention. This description is made for the purpose of illustrating the general principles of the invention and should not be taken in a limiting sense. The scope of the present invention is best determined by reference to the appended claims.

Figure 1:
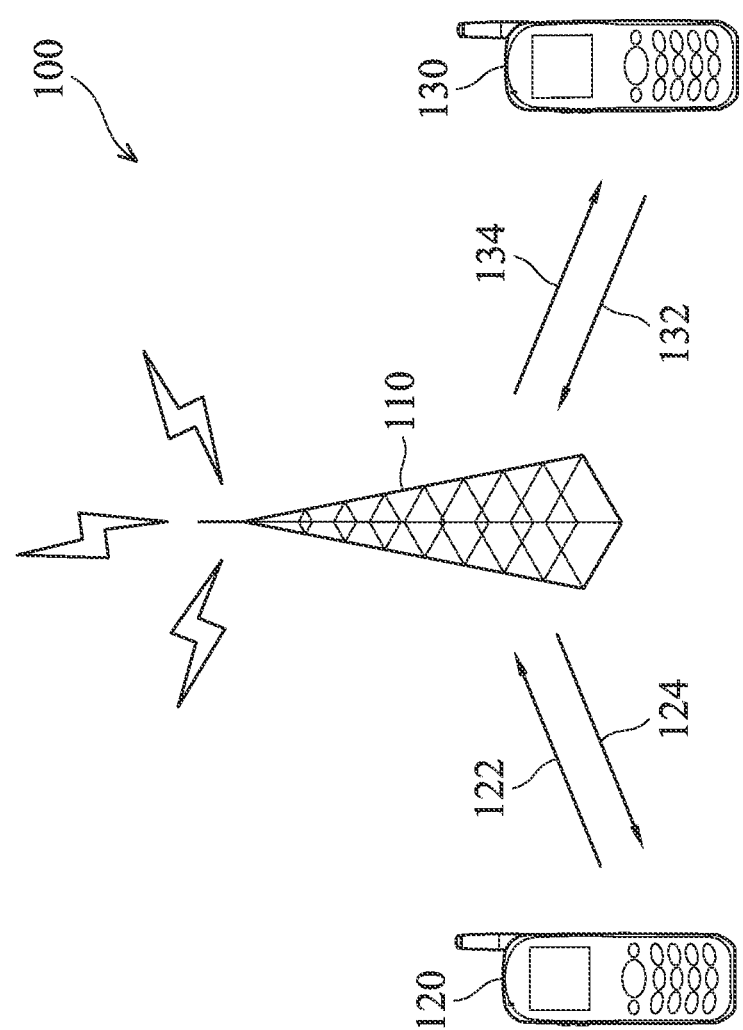
FIG. 1 shows a wireless communication system according to one embodiment of the invention.

FIG. 1 shows a multiple access wireless communication system 100 according to one embodiment of the invention. A multiple access wireless communication system 100 includes a Node B 110, user equipments 120 and 130. The user equipment 120 is in communication with a first antenna group (not shown in FIG. 1) of the node B 110, wherein the first antenna group transmits information to the user equipment 120 over downlink 124, and receives information from the user equipment 120 over uplink 122. The user equipment 130 is in communication with a second antenna group (not shown in FIG. 1) of the Node B 110, wherein the second antenna group transmits information to the user equipment 130 over downlink 134, and receives information from the user equipment 130 over uplink 132. In a frequency division duplexing (FDD) system, uplinks 122, 132 and downlinks 124, 134 may use different frequency for communication. For example, downlink 124 may use a different frequency from that used by uplink 122.

A Node B may be a fixed station or base station used for communicating with the terminals and may also be referred to as an access point, an access network (AN), a base station, an enhanced base station, an evolved Node B (eNB), or some other terminology. User equipment (UE) may also be called an access terminal (AT), a wireless communication device, terminal, access terminal or some other terminology. The Node B 110 and the user equipments 120 and 130 in FIG. 1 comprises at least one transmitting unit (not shown in FIG. 1), a receiving unit (not shown in FIG. 1) and a processing unit (not shown in FIG. 1), respectively, wherein the transmitting unit and the receiving unit are coupled to the processing unit. The UE 120 can comprise modules supporting the embodiments of the invention, such as a configuration management module used to manage a UL-DL configuration and change the related operation, UL processing module and DL processing module used to process UL and DL data, respectively. And optionally, the UE 120 and the base station can comprise a buffer module, etc.

In the 3GPP LTE standard, a HARQ mechanism should follow the fixed timing requirements. For a UL HARQ and a DL HARQ, there should be a specific time interval between data channel detection and the corresponding a HARQ-ACK/NACK reporting. In addition, in the UL HARQ, there should be a specific time interval between a UL grant used for scheduling PUSCH and the corresponding PUSCH transmission. For example, for the DL HARQ process, when the PDSCH is detected in subframe n, then the corresponding HARQ-ACK is reported in the subframe n+k to the base station (e.g., a Node B, an Evolved Node B (eNB), etc., hereinafter referred to as an eNB). Similarly, for the UL HARQ process, when the UL grant is detected in subframe n, the corresponding UL grant PUSCH should be transmitted in the subframe n+$k_1$. Then, the HARQ-ACK corresponding to the PUSCH is included in subframe n+$k_1$+$k_2$ to inform the UE. In order to give the UE and the eNB a data processing time which is not less than four milliseconds, the values of n, $k_1$ and $k_2$ are not less than 4. In the FDD LTE system, all the values of n, $k_1$ and $k_2$ are 4. In the TD-LTE systems, for different UL HARQ processes of different UL-DL configurations, the values of n, $k_1$ and $k_2$ may be different.

Compared with the FDD system, one of the big advantages of the TDD system is to use the UL-DL configuration to achieve an uplink and downlink asymmetric resource allocation. In the 3GPP LTE standard, there are seven different UL-DL configurations (shown in TABLE 1), wherein the proportion occupied by the UL subframe is 10% to 60%. For a small cell only having a small number of users, the uplink and downlink traffic may be frequently changed. If the UL-DL configuration can be configured according to the uplink and downlink traffic, it can significantly improve the system efficiency. For these scenes where the uplink and downlink traffic is changed rapidly, it is beneficial to dynamically or semi-statically configure a proper UL-DL configuration. In the current 3GPP LTE standard, the standard specifies the HARQ timing requirements of different UL-DL configurations. However, the HARQ timing when the UL-DL configuration is changed is not considered. Therefore, it is necessary to modify the current HARQ timing to support the dynamic or semi-static UL-DL reconfiguration, and consider the impact of changing the number of HARQ processes during the proportion reconfiguration of the UL-DL subframe, such as the terminating and starting of the HARQ process. Those having ordinary skill in the art will appreciate that the beneficial effects of the HARQ timing and the processes during the UL-DL reconfiguration are not limited to the above.

TABLE 1

UL-DL configuration

| UL-DL config-uration | DL to UL switching cycle | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the TD-LTE system, the quantities of the UL-DL HARQ processes of the different UL-DL configurations are shown in TABLE 2. The quantities of the HARQ processes of the different UL-DL configurations may be different. It means that the number of parallel HARQ processes may be changed during the UL-DL subframe reconfiguration.

For asynchronous DL HARQ, each HARQ process ID can be indicated in downlink control information (DCI). The eNB may decrease or increase the number of parallel HARQ processes by scheduling the process IDs, so changing the number of DL HARQ processes will not have a greater influence. The UE may establish the corresponding HARQ modules and buffers according to the maximum number of DL HARQ processes of all supported UL-DL configurations, wherein each HARQ process may correspond to a HARQ module and a buffer. Furthermore, the design and calculation related to the number of DL HARQ processes should be determined according to the maximum number of parallel HARQ processes, such as the calculation of soft buffer size for a transport block.

For synchronous UL HARQ, each first transmission and retransmission of the HARQ process corresponds to a specific timing. The change of the number of HARQ processes will have a greater influence. For example, when the number of UL HARQ processes is reduced, the reduced UL HARQ processes shall be terminated; when a UL HARQ process cannot maintain continuous operation during the change of the UL-DL configuration, the UL HARQ process should be terminated and another HARQ process is started. The continuity of the HARQ process means that the corresponding first transmission under the previous UL-DL configuration can be correctly combined with the corresponding retransmission under the current UL-DL configuration.

Figure 2:
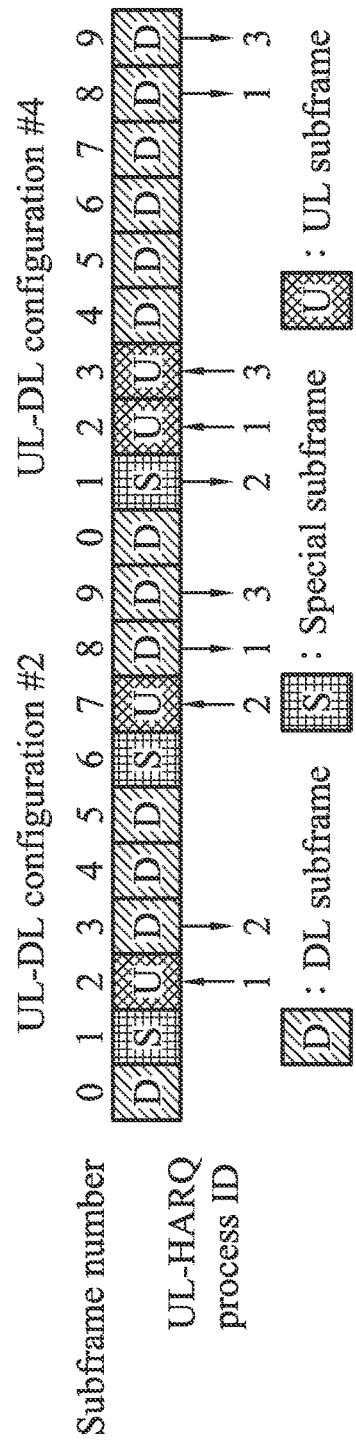
FIG. 2 is a schematic diagram illustrating a discontinuous UL HARQ process according to one embodiment of the present invention.

FIG. 2 is a schematic diagram illustrating a discontinuous UL HARQ process according to one embodiment of the present invention. Although the number of the UL HARQ processes is not changed when the UL-DL configuration is changed from #2 to #4, i.e., the number of the UL HARQ processes is 2 for the two UL-DL configurations, there are only six subframe intervals between the subframe #7 of the previous UL-DL configuration and the subframe #3 of the current UL-DL configuration, i.e., the interval between two PUSCH transmissions is less than 8 ms. Therefore, the UL HARQ process #2 cannot maintain continuous operation during the change of the UL-DL configuration. For the non-continuous UL HARQ processes, one solution is to terminate the UL HARQ process and to activate another UL HARQ process, i.e., the UL HARQ processes #2 is terminated in the subframe #1 of the current UL-DL configuration, another UL HARQ process #3 is activated in the subframe #9 of the previous UL-DL configuration. The exemplary embodiments described above are for illustrative purposes only and are not meant to be a limitation of the present invention.

TABLE 2

The number of HARQ processes in TD-LTE system

| UL-DL configuration | Number of DL HARQ processes | Number of UL HARQ processes |
|---|---|---|
| 0 | 4 | 7 |
| 1 | 7 | 4 |
| 2 | 10 | 2 |
| 3 | 9 | 3 |
| 4 | 12 | 2 |
| 5 | 15 | 1 |
| 6 | 6 | 6 |

When the number of HARQ processes is increased, for the DL HARQ process, the ID of the increased HARQ process may be indicated in the DCI, and the UE only needs to activate the corresponding HARQ module and HARQ buffer. For the UL HARQ process, the UL grant for scheduling PUSCH needs to be transmitted to the UE before at least 4 subframes prior to the PUSCH transmission, i.e., the UL grant can be used as a starting point of the UL HARQ process. The UE can detect the UL grant at the new starting point of the HARQ process. In one embodiment, the UL grant can be transmitted in the previous UL-DL configuration, and can also be transmitted in the current UL-DL configuration. When the UL grant is transmitted in the previous UL-DL configuration, the UE needs to obtain the current UL-DL reconfiguration signaling before detecting the UL grant. Otherwise, the UE cannot detect the UL grant and may miss the corresponding PUSCH transmission. In summary, after the UE detects the UL grant at the starting point, the UE establishes the corresponding HARQ module and HARQ buffer for the increased UL HARQ process.

Figure 3:
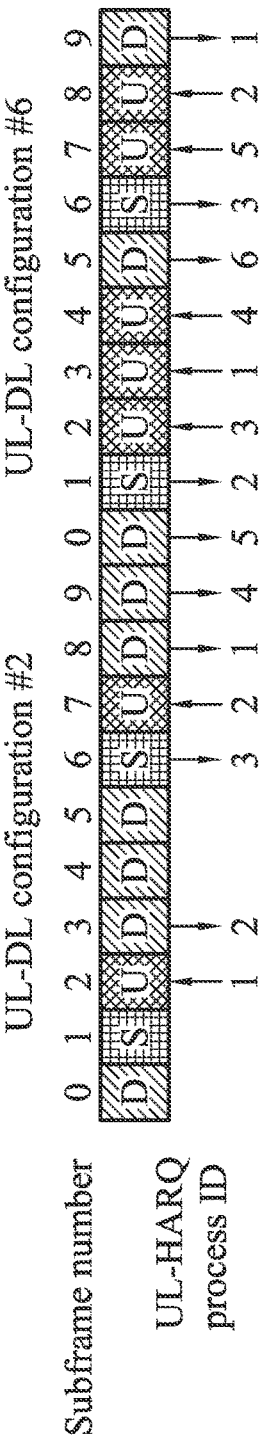
FIG. 3 is a schematic diagram illustrating the number of UL HARQ processes being increased when the UL-DL configuration is changed according to one embodiment of the present invention.

FIG. 3 is a schematic diagram illustrating the number of UL HARQ processes being increased according to one embodiment of the present invention. In FIG. 3, the UL-DL configuration is changed from #2 to #6, and the corresponding number of UL HARQ processes is increased from 2 to 6. In order to schedule the increased UL subframe #3 and #4 in the current UL-DL configuration, the corresponding UL grant should be transmitted in the DL subframe #6 and #9 in the previous UL-DL configuration. It means that the increased UL HARQ process #3 and #4 should be started in the last frame of the previous UL-DL configuration, while the other two increased UL HARQ processes #5 and #6 should be started in the subframe #0 and #5 of the first frame of the current UL-DL configuration. In other words, the two HARQ process (process #1 and #2) in the previous UL-DL configuration maintain continuous operation into the current UL-DL configuration. The continuous operation of the process #1 means that the PUSCH of the subframe #2 of the previous UL-DL configuration can be combined with the PUSCH of the subframe #3 of the previous UL-DL configuration.

TABLE 3 shows the starting points of the increased UL HARQ processes when the UL-DL configuration is changed. Cfg in TABLE 3 represents the UL-DL configuration, and Cfg1→Cfg0 represents the configuration is changed from 1 to 0, and so on. For the increased UL HARQ process, when the UL grant is detected in the subframe n, the associated PUSCH can be transmitted in the subframe n+$K_{UL\_grant}$. For the UL-DL configuration #0, when the lowest bit (LSB) of the UL index in the DCI carrying the UL grant is set to 1, $K_{UL\_grant}=7$. Otherwise, $K_{UL\_grant}=4$. As shown in TABLE 3, most parts of increased UL HARQ process can be started in the current UL-DL configuration, and a small part of the increased UL HARQ process can be started in the previous UL-DL configuration.

TABLE 3

The starting point of the new started UL HARQ process, $K_{UL\_grant}$.

| The reconfiguration of TDD UL-DL configuration | The subframe n of the previous UL-DL configuration | | | | | | | | | | The subframe n of the current UL-DL configuration | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 |
| Cfg1→Cfg0 | — | — | — | — | — | — | — | — | — | — | 4/7 | — | — | — | — | 7 | — | — | — |
| Cfg1→Cfg3 | — | — | — | — | — | — | — | — | — | — | 4 | — | — | — | — | — | — | — | — |
| Cfg1→Cfg6 | — | — | — | — | — | 7 | — | — | — | — | 7 | — | — | — | — | — | — | — | — |
| Cfg2→Cfg0 | — | — | — | — | — | — | — | — | — | 4 | 4/7 | — | — | — | — | 4/7 | — | — | — |
| Cfg2→Cfg1 | — | — | — | — | — | — | — | — | — | 4 | — | — | — | — | 4 | — | — | — | — |
| Cfg2→Cfg3 | — | — | — | — | — | — | — | — | — | 4 | 4 | — | — | — | — | — | — | — | — |
| Cfg2→Cfg4 | — | — | — | — | — | — | — | — | — | 4 | — | — | — | — | — | — | — | — | — |
| Cfg2→Cfg6 | — | — | — | — | — | — | 6 | — | — | — | 5 | — | — | — | — | 6 | — | — | — |
| Cfg3→Cfg0 | — | — | — | — | — | — | — | — | — | — | 7 | 7 | — | — | — | 4/7 | — | — | — |
| Cfg3→Cfg1 | — | — | — | — | — | — | — | — | — | — | — | — | — | — | 4 | — | — | — | — |
| Cfg3→Cfg6 | — | — | — | — | — | — | — | 5 | — | — | 7 | — | — | — | 7 | — | — | — | — |
| Cfg4→Cfg0 | — | — | — | — | — | — | — | — | — | — | 4/7 | 7 | — | — | — | 4/7 | — | — | — |
| Cfg4→Cfg1 | — | — | — | — | — | — | — | — | — | — | 6 | — | — | — | 4 | — | — | — | — |
| Cfg4→Cfg3 | — | — | — | — | — | — | — | — | — | — | 4 | — | — | — | — | — | — | — | — |
| Cfg4→Cfg6 | — | — | — | — | — | — | — | 5 | — | — | 7 | 7 | — | — | 7 | — | — | — | — |
| Cfg5→Cfg0 | — | — | — | — | — | — | — | — | — | 4 | 4/7 | 7 | — | — | — | 4/7 | — | — | — |
| Cfg5→Cfg1 | — | — | — | — | — | — | — | — | — | 4 | 6 | — | — | — | 4 | — | — | — | — |
| Cfg5→Cfg2 | — | — | — | — | — | — | — | — | — | — | — | — | — | 4 | — | — | — | — | — |
| Cfg5→Cfg3 | — | — | — | — | — | — | — | — | — | — | 4 | 4 | — | — | — | — | — | — | — |
| Cfg5→Cfg4 | — | — | — | — | — | — | — | — | — | — | 4 | — | — | — | — | — | — | — | — |
| Cfg5→Cfg6 | — | — | — | — | — | — | — | 5 | — | 5 | 7 | 7 | — | — | — | 7 | — | — | — |

For asynchronous DL HARQ, a HARQ process ID is indicated in the DCI. When the number of HARQ processes is reduced, the eNB can reduce the number of parallel HARQ processes within a HARQ RTT by scheduling the HARQ process ID. Therefore, reducing the number of DL HARQ processes does not affect the current LTE standard. For synchronous UL HARQ, each HARQ process corresponds to a fixed timing requirement. When the number of HARQ processes is reduced, some UL HARQ processes should be terminated. The last physical HARQ indicator channel (PHICH) of the UL HARQ process can be a termination point of the termination of the UL HARQ process. In other words, the termination of the UL HARQ process can be executed after the PHICH. In one embodiment, the termination point of the UL HARQ process may occur in the previous UL-DL configuration or in the current UL-DL configuration.

According to one embodiment of the present invention, there are many solutions to terminating a UL HARQ process. FIGS. 4~6B are schematic diagrams illustrating different handling methods for the UE and the eNB to terminate a UL HARQ process.

Figure 4:
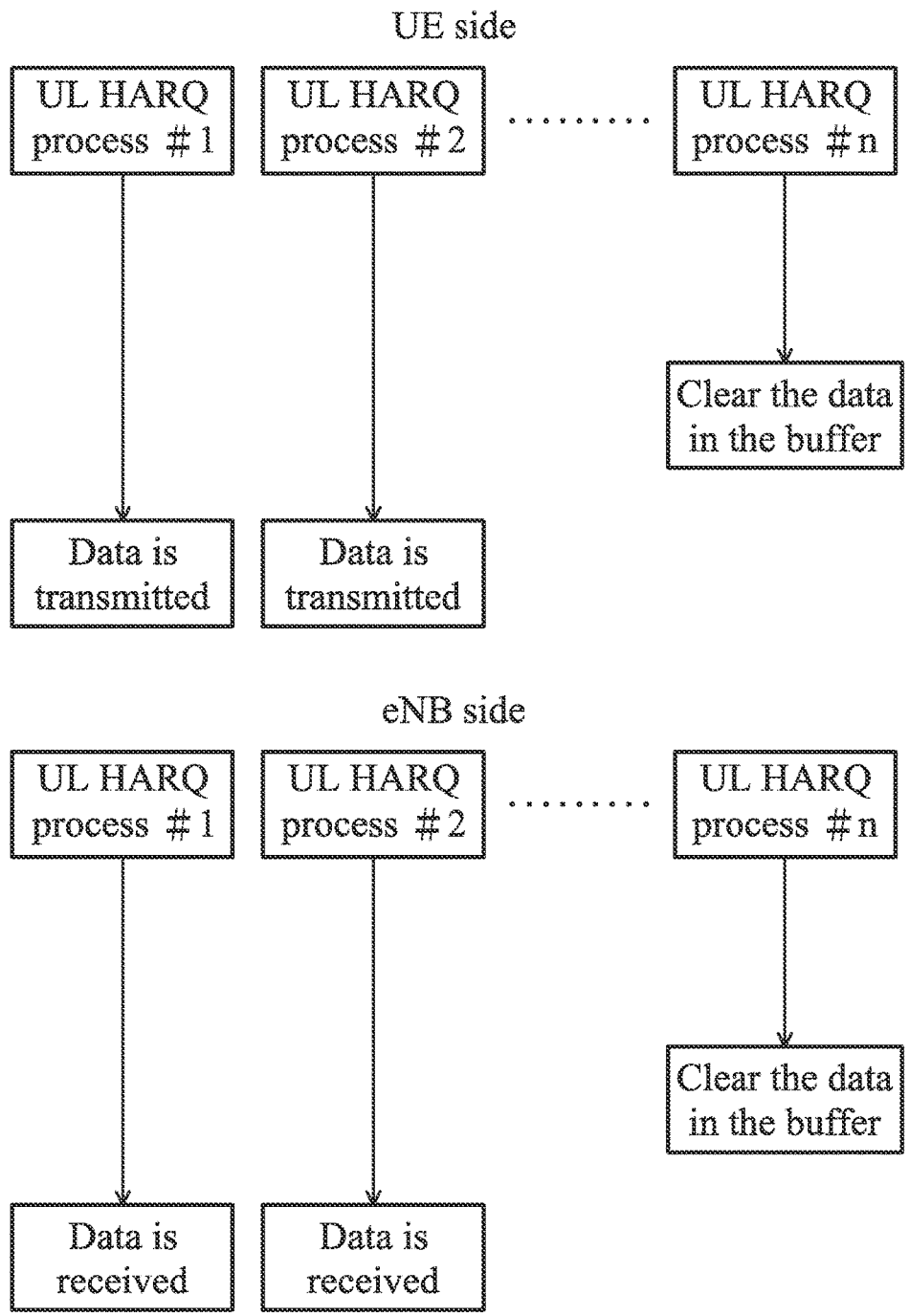
FIG. 4 is a schematic diagram illustrating a UL HARQ process being terminated according to one embodiment of the present invention.

According to one embodiment of the present invention, the steps of terminating a UL HARQ process at the UE side and the eNB side are shown in FIG. 4. When the UL HARQ process #n is terminated, the UE and the eNB can clear the data in the buffer corresponding to the terminated UL HARQ process. At the UE side, no matter whether the received HARQ-ACK is an ACK and the number of retransmissions reaches the configured maximum number of retransmissions, the UE clears the data in the corresponding buffer, including the source transport block (TB) data and the coded data. In the eNB side, no matter whether the PUSCH is successfully decoded and the number of retransmissions reaches the configured maximum number of retransmissions, the eNB clears the data in the corresponding buffer. The HARQ process described above is different from the existing HARQ mechanism. In the existing HARQ mechanism, the UE clears the corresponding buffer when the UE receives new data indicated in a new data indicator (NDI) of the UL grant or the number of retransmissions reaches the configured maximum number of retransmissions. The eNB clears the corresponding buffer when the PUSCH is successfully decoded or the number of retransmissions reaches the configured maximum number of retransmissions.

Figure 5A:
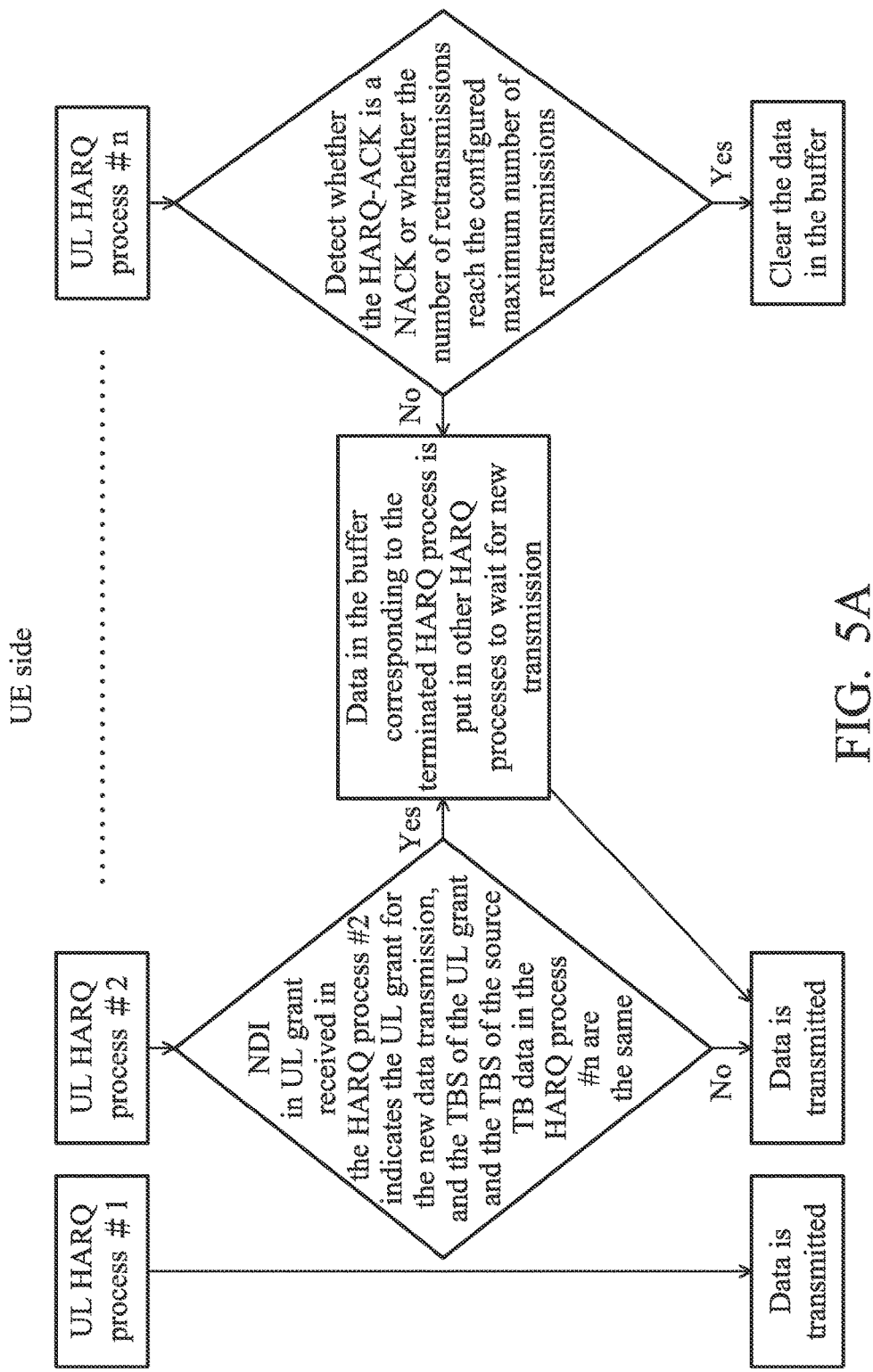
FIG. 5A and FIG. 5B are schematic diagrams illustrating a UL HARQ process is terminated according to one embodiment of the present invention
Figure 5B:
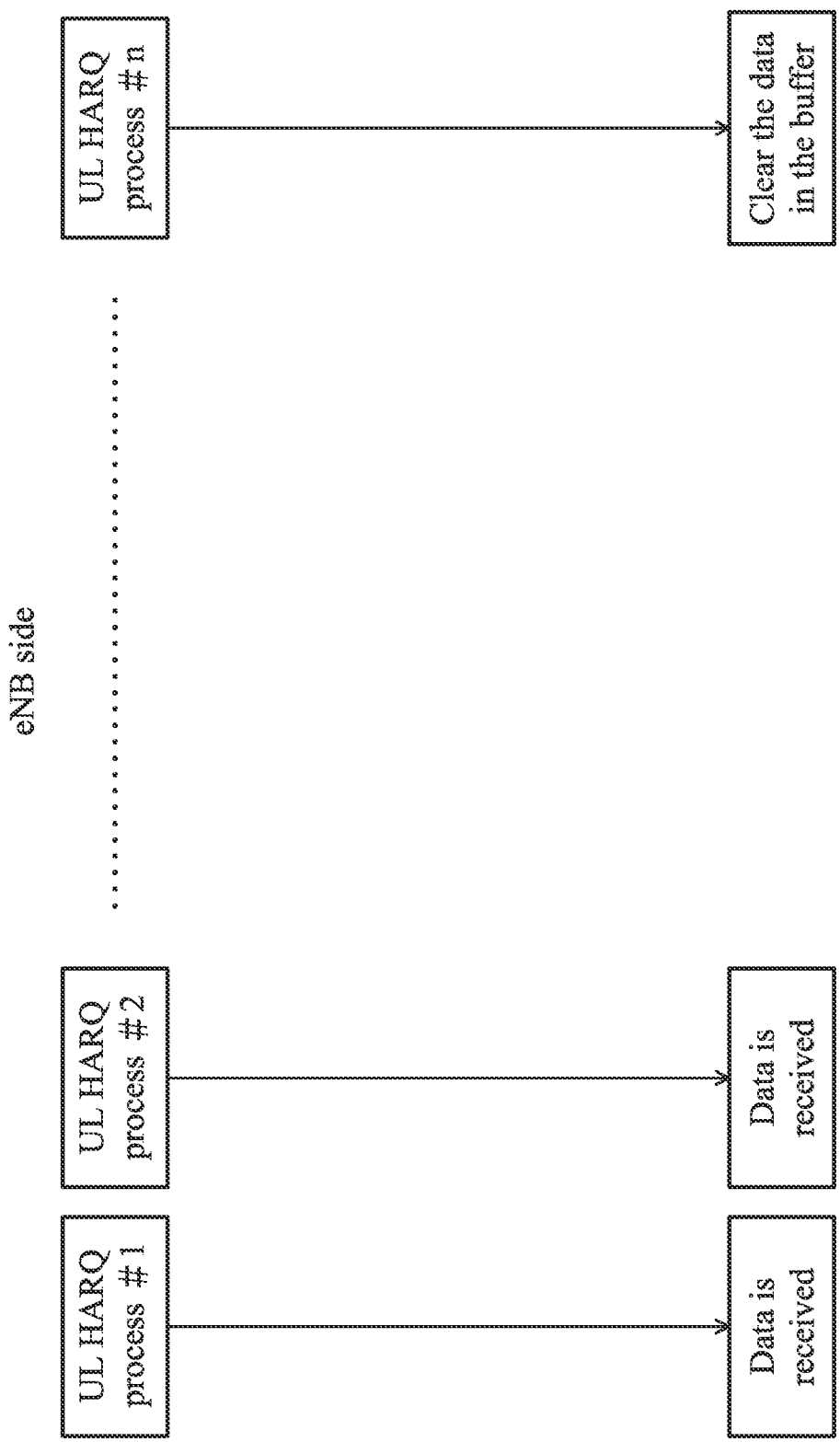

According to another embodiment of the present invention, the steps of terminating a UL HARQ process at the UE side and the eNB side are shown in FIG. 5A and FIG. 5B. When the UL HARQ process #n is terminated, at the eNB side, the eNB clears the combined data in the corresponding buffer no matter whether the PUSCH is successfully decoded or the number of retransmissions reaches the configured maximum number of retransmissions. At the UE side, the UE clears the data in the corresponding buffer, including the source TB data and the coded data when the UE detects that the HARQ-ACK is an ACK or the number of retransmissions reaches the configured maximum number of retransmissions. When the HARQ-ACK is a NACK and the number of retransmissions does not reach the configured maximum number of retransmissions, the source TB data in the corresponding buffer corresponding to the HARQ process can be put in other HARQ processes to wait for transmission. For example, when the NDI in the UL grant received in the HARQ process #2 indicates that new data is transmitted, and the TBS of the UL grant and the TBS of the source TB data in the HARQ process #n are the same, the source TB data in the HARQ process #n is put in the buffer of the HARQ process #2 and is transmitted as a new data transmission.

Figure 6A:
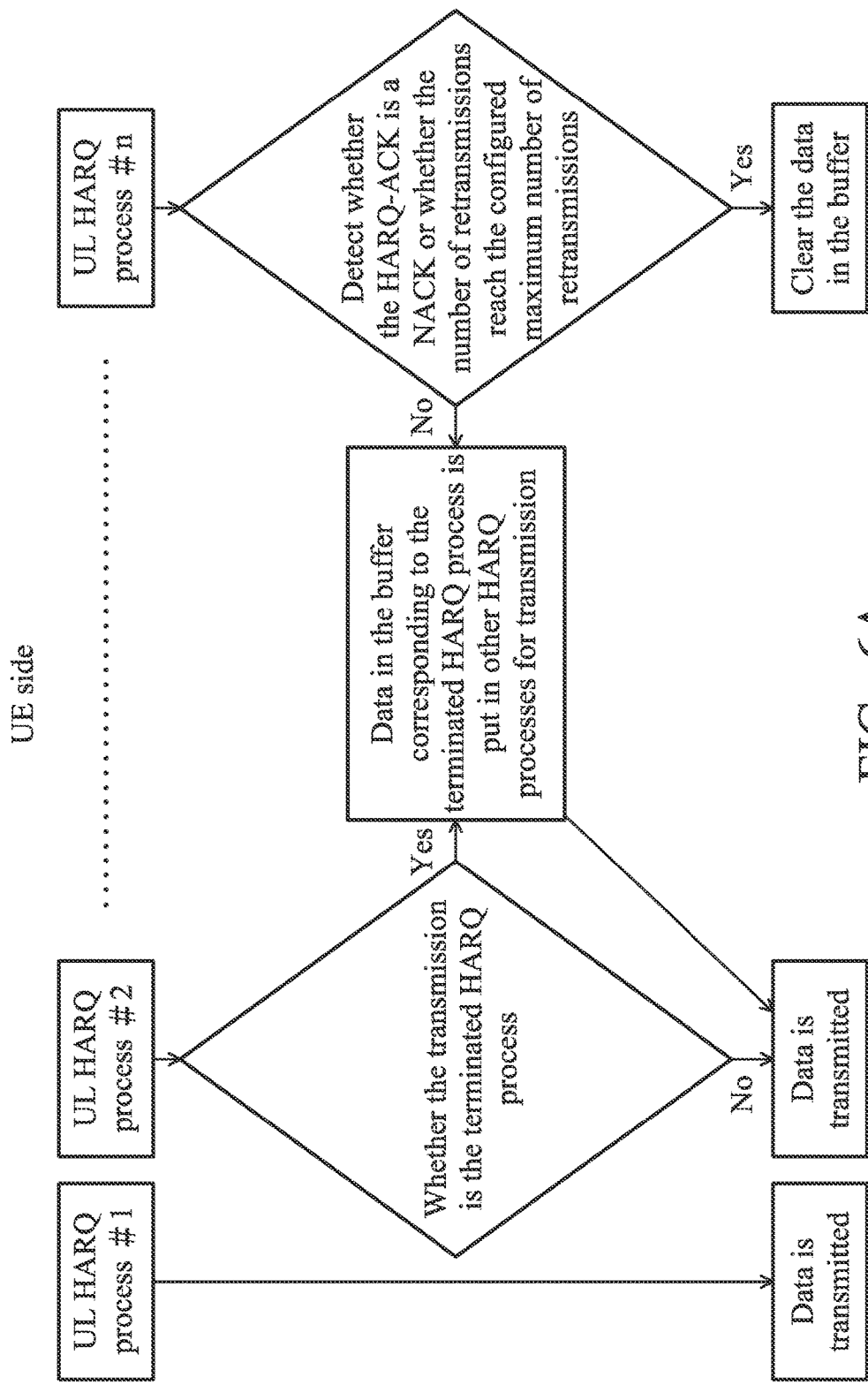
FIG. 6A and FIG. 6B are schematic diagrams illustrating a UL HARQ process being terminated according to one embodiment of the present invention
Figure 6B:
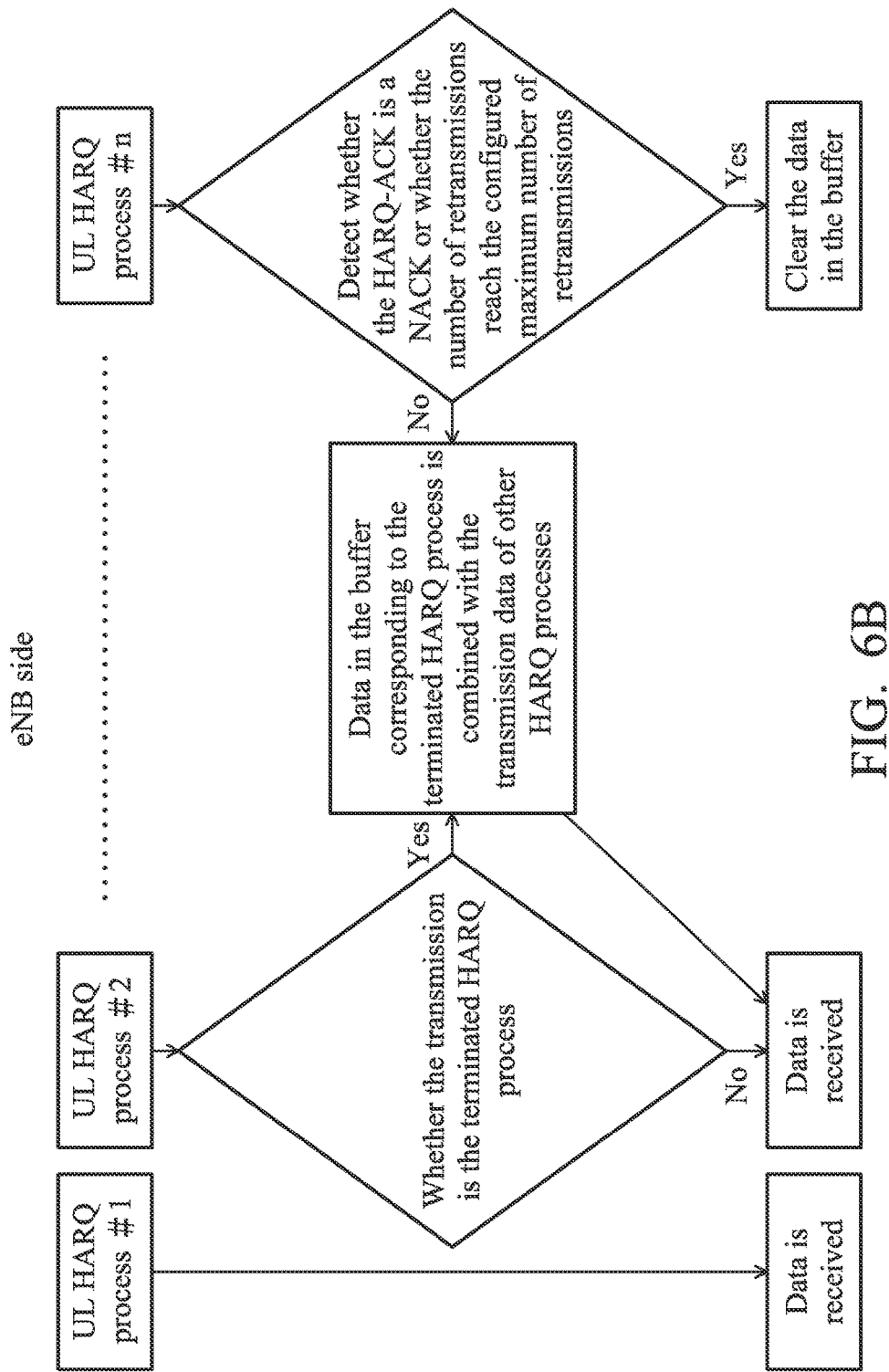

According to another embodiment of the present invention, the steps of terminating a UL HARQ process on the UE side and the eNB side are shown in FIG. 6A and FIG. 6B. When the UL HARQ process #n is terminated, at the UE side, the UE clears the data in the corresponding buffer corresponding to the UL HARQ process, e.g., the source TB data and the coded TB data, when the UE detects the HARQ-ACK is an ACK or the number of retransmissions reaches the configured maximum number of retransmissions. At the eNB side, the eNB clears the data in the corresponding buffer corresponding to the HARQ process when the PUSCH is successfully decoded or the number of retransmissions reaches the configured maximum number of retransmissions. At the UE side, when the UE detects that the HARQ-ACK is an NACK and the number of retransmissions does not reach the configured maximum number of retransmissions, the coded data in the corresponding buffer corresponding to the HARQ process can be retransmitted in the other activated HARQ process. When the number of terminated HARQ processes is less than or equal to the number of activated HARQ processes, the one-to-one mapping relationship between the terminated HARQ process and the activated HARQ process can be specified according to a predefined manner or radio resource control (RRC) signaling, the priorities of the retransmissions of the terminated HARQ process and activated HARQ process can also be specified according to a predefined manner or radio resource control (RRC) signaling, and dynamic scheduling between the terminated HARQ process and the activated HARQ process can also be specified according to the RRC signaling. When the number of terminated HARQ processes is greater than the number of activated HARQ processes, i.e., the quantities of the terminated HARQ processes are transmitted in an activated HARQ process, a multiple-to-one relationship between the terminated HARQ process and the activated HARQ process can be specified according to a predefined manner or radio resource control (RRC) signaling, the priorities of the retransmissions of the terminated HARQ processes and activated HARQ processes can also be specified according to a predefined manner or radio resource control (RRC) signaling, and dynamic scheduling between the terminated HARQ processes and the activated HARQ processes can also be specified according to the RRC signaling. The predefined manner does not require additional signaling overhead. The RRC signaling requires additional signaling overhead. The physical layer signaling can reuse the existing physical layer signaling indication field and does not add the signaling overhead.

In one embodiment, the retransmissions of using the physical layer signaling dynamic scheduling terminated HARQ process or the retransmissions of the corresponding activated HARQ process should be based on the UL grant, wherein the UL grant should indicate that the retransmission belongs to which HARQ process. When the relationship between the terminated HARQ process and the activated HARQ process is the one-to-one mapping relationship, 1 bit in the DCI 0/4 of the UL grant can be used to indicate the retransmission information. When the value of the bit is 0, 0 indicates that the activated HARQ process is retransmitted normally. When the value of the bit is 1, 1 indicates that the retransmission is used for the terminated HARQ process #n, wherein the count of the number of retransmissions may comprise the number of retransmissions before the end of the HARQ process #n. The 1 bit can reuse the existing indication field in the DCI 0/4, i.e., 1-bit sounding reference signal (SRS) request field. When the relationship between the terminated HARQ process and the activated HARQ process is the multiple-to-one mapping relationship, $\lceil \log_2 (N+1) \rceil$ bit can be used in the DCI 0/4 to indicate that the retransmission is performed for the activated HARQ process or which one terminated HARQ process is selected for the retransmission from N terminated HARQ processes.

The number of retransmissions of the HARQ processes can contain the number of retransmissions before the end of the terminated HARQ processes. The $\lceil \log_2 (N+1) \rceil$ bit can reuse the existing indication domain in the DCI 0/4, such as 2-bit of PUSCH transmission power control domain, or 3 bits of demodulation reference signal (DMRS) cyclic shift indicator.

In one embodiment, the mapping relationship between the terminated HARQ process and the activated HARQ process can be specified according to the predefined manner, wherein the mapping relationship can be one-to-one or multiple-to-one. For example, the UE searches the relationship according to a pre-existing table when selecting the activated HARQ process corresponding to each terminated HARQ process. In one embodiment, the priorities of the retransmissions of the terminated HARQ processes and activated HARQ processes are specified according to the predefined manner. For example, the retransmission of the terminated HARQ processes has higher priority than the retransmission of the corresponding activated HARQ processes, or the retransmission of the corresponding activated HARQ processes has higher priority than the retransmission of the terminated HARQ processes. When multiple terminated HARQ processes correspond to an activated HARQ process, the retransmission of the HARQ process which is firstly finished has the highest priority among the multiple terminated HARQ processes.

Figure 7:
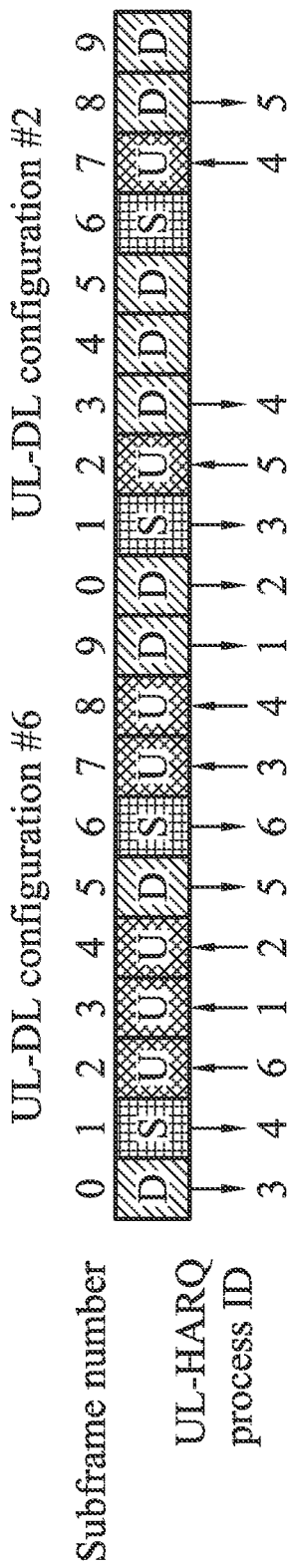
FIG. 7 is a schematic diagram illustrating that the number of HARQ processes is reduced when the UL-DL configuration is changed according to an embodiment of the present invention.

FIG. 7 is a schematic diagram illustrating that the number of HARQ processes is reduced when the UL-DL configuration is changed according to an embodiment of the present invention. As shown in FIG. 7, the UL-DL configuration is changed from #6 to #2, and the number of UL HARQ processes is reduced from 6 to 2, wherein 4 UL HARQ processes are terminated. Specifically, the UL HARQ processes #6 and #1 are terminated in the DL subframe #6 and #9 of the previous UL-DL configuration, respectively. The UL HARQ processes #2 and #3 are terminated in the DL subframe #0 and #1 of the current UL-DL configuration, respectively. One skilled in the art will appreciate that certain UL HARQ processes can maintain continuous operation, such as the UL HARQ processes #4 and #5, during the reconfiguration, which is similar to FIG. 1, and will not be repeated here for the sake of brevity.

TABLE 4 shows the ending points of all the terminated UL HARQ processes when the UL-DL configuration is changed. For the terminated UL HARQ process, the PHICH transmitted in the ending point, i.e. the subframe n, can correspond to the PUSCH transmitted in the subframe n−$K_{PHICH}$ of the present process. For the UL-DL configuration #0, when the PHICH is received in the subframe #0 or the subframes #5 with a PHICH resource corresponding to $I_{PHICH}=0$, $K_{PHICH}=7$. Otherwise, $K_{PHICH}=6$. As shown in TABLE 4, those skilled in the art can understand that part of the UL HARQ processes may be terminated in the previous UL-DL configuration, the other part of the UL HARQ processes may be terminated in the current UL-DL configuration, and the scope of the present invention should not be limited herein.

TABLE 4

The end point of the terminated UL HARQ process, $K_{PHICH}$.

| The reconfiguration of UL-DL | The subframe n of the previous UL-DL configuration | | | | | | | | | | The subframe n of the current UL-DL configuration | | | | | | | | | |
|---|---|---|---|---|---|---|---|---|---|---|---|---|---|---|---|---|---|---|---|---|
| subframe | 0 | 1 | 2 | 3 | 4 | 5 | 6 | 7 | 8 | 9 | 0 | 1 | 2 | 3 | 4 | 5 | 6 | 7 | 8 | 9 |
| Cfg0→Cfg1 | — | — | — | — | — | — | — | — | — | — | 6/7 | — | — | — | — | 6 | — | — | — | — |
| Cfg0→Cfg2 | — | — | — | — | — | — | 4 | — | — | — | 6/7 | 4 | — | — | — | 6 | — | — | — | — |
| Cfg0→Cfg3 | — | — | — | — | — | — | — | — | — | — | 6/7 | — | — | — | — | 6/7 | — | — | — | — |
| Cfg0→Cfg4 | — | — | — | — | — | — | — | — | — | — | 6/7 | 4 | — | — | — | 6/7 | — | — | — | — |
| Cfg0→Cfg5 | — | — | — | — | — | — | 4 | — | — | — | 6/7 | 4 | — | — | — | 6/7 | — | — | — | — |
| Cfg0→Cfg6 | — | — | — | — | — | — | — | — | — | — | — | — | — | — | — | 6 | — | — | — | — |
| Cfg1→Cfg2 | — | — | — | — | — | — | — | — | — | 6 | — | 4 | — | — | — | — | — | — | — | — |
| Cfg1→Cfg3 | — | — | — | — | — | — | — | — | — | — | — | 4 | — | — | — | 7 | — | — | — | — |
| Cfg1→Cfg4 | — | — | — | — | — | — | — | — | — | — | — | 4 | — | — | 6 | — | — | — | — | — |
| Cfg1→Cfg5 | — | — | — | — | — | — | — | — | — | 6 | — | 4 | — | — | 6 | — | — | — | — | — |
| Cfg2→Cfg3 | — | — | — | — | — | — | — | — | — | — | — | 4 | — | — | — | — | — | — | — | — |
| Cfg2→Cfg4 | — | — | — | — | — | — | — | — | — | — | — | 4 | — | — | — | — | — | — | — | — |
| Cfg2→Cfg5 | — | — | — | — | — | — | — | — | — | — | — | — | — | — | 6 | — | — | — | — | — |
| Cfg3→Cfg2 | — | — | — | — | — | — | — | — | — | 6 | — | — | — | — | — | — | — | — | — | — |
| Cfg3→Cfg4 | — | — | — | — | — | — | — | — | — | — | 6 | — | — | — | — | — | — | — | — | — |
| Cfg3→Cfg5 | — | — | — | — | — | — | — | — | — | 6 | 6 | — | — | — | — | — | — | — | — | — |
| Cfg4→Cfg5 | — | — | — | — | — | — | — | — | — | 6 | — | — | — | — | — | — | — | — | — | — |
| Cfg6→Cfg1 | — | — | — | — | — | — | — | — | — | 6 | 6 | — | — | — | — | — | — | — | — | — |
| Cfg6→Cfg2 | — | — | — | — | — | — | 4 | — | — | 6 | 6 | 4 | — | — | — | — | — | — | — | — |
| Cfg6→Cfg3 | — | — | — | — | — | — | — | — | — | 6 | 6 | — | — | — | — | 7 | — | — | — | — |
| Cfg6→Cfg4 | — | — | — | — | — | — | — | — | — | 6 | 6 | 4 | — | — | — | 7 | — | — | — | — |
| Cfg6→Cfg5 | — | — | — | — | — | — | 4 | — | — | 6 | 6 | 4 | — | — | — | 7 | — | — | — | — |

It is assumed that $N_{old}$ is the number of UL HARQ processes of the previous UL-DL configuration, and $N_{new}$ is the number of UL HARQ processes of the current UL-DL configuration. For most cases in TABLE 3 and TABLE 4, when $N_{new}>N_{old}$, at least $N_{new}-N_{old}$ increased UL HARQ processes are started. When $N_{new}<N_{old}$, at least $N_{old}-N_{new}$ reduced UL HARQ processes are terminated. In another embodiment, there may be more UL HARQ processes terminated or started. Because the interval between the retransmission and first transmission of the PUSCH is at least 8 ms, and the interval between the HARQ-ACK reporting and the data transmission is at least 4 ms, it is difficult for certain UL HARQ processes to maintain continuous operation during the UL-DL reconfiguration. The HARQ process will be terminated and another HARQ process will be started. For example, when the UL-DL configuration is reconfigured from #1 to #3, two UL HARQ processes can be terminated and a UL HARQ process can be started although one UL HARQ process is reduced. When the UL-DL configuration from is reconfigured from #2 to #3, two UL HARQ processes can be started and a UL HARQ process can be terminated although one UL HARQ process is increased. When the UL-DL configuration is reconfigured from #2 to #4, one UL HARQ process can be terminated and one UL HARQ process can be started although the number of UL HARQ processes is not changed.

Figure 8:
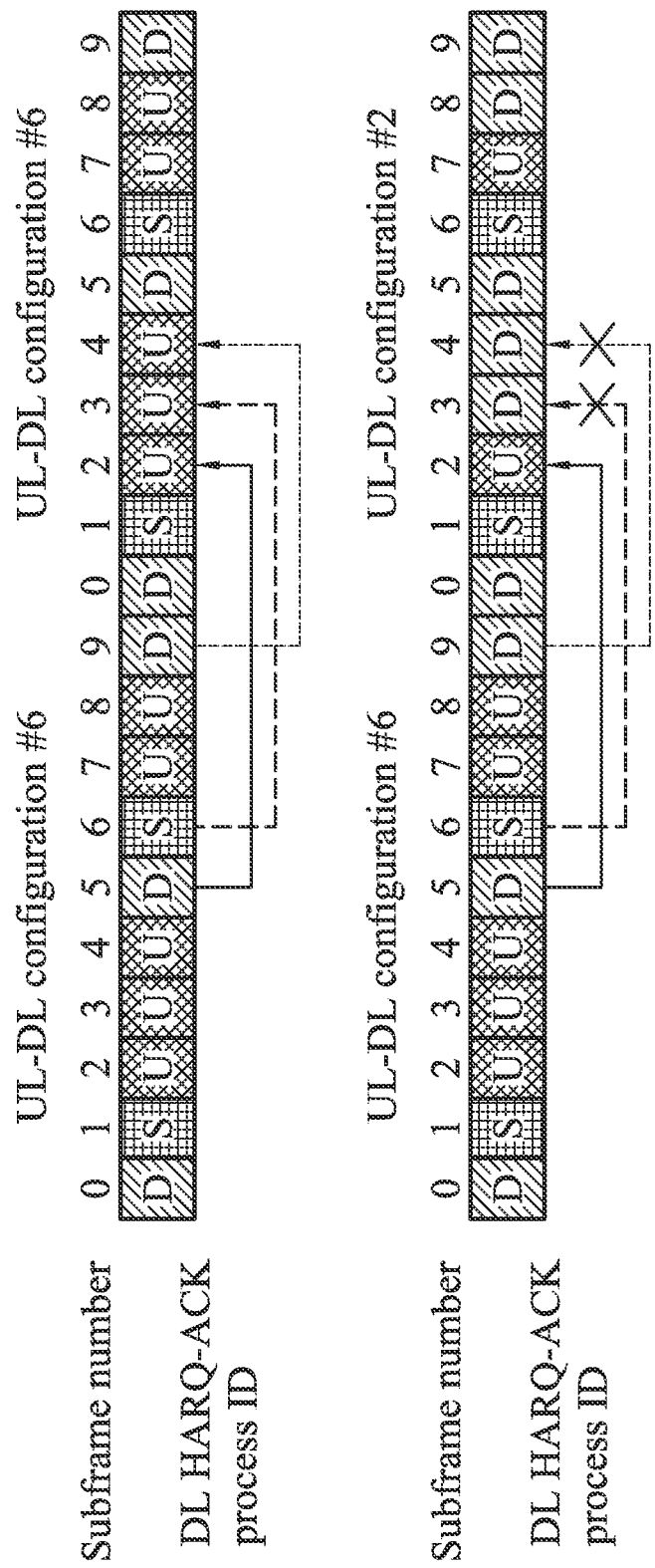
FIG. 8 is an example illustrating that the existing DL HARQ-ACK timing is not available during the UL-DL reconfiguration.

When the UL-DL configuration is reconfigured, another main issue that needs to be considered is the HARQ timing besides the issue of the number of HARQ processes being changed. The existing HARQ timing may be unavailable during the UL-DL reconfiguration. FIG. 8 is an example illustrating that the existing DL HARQ-ACK timing is unavailable during the UL-DL reconfiguration. When the UL-DL configuration is reconfigured from #6 to #2, a HARQ-ACK of the PDSCH transmitted in the subframe #6 and #9 should be transmitted in the subframe #3 and #4 of the next frame according to the existing DL HARQ-ACK timing of the UL-DL configuration #6. However, the subframes #3 and #4 of the UL-DL configuration #2 are DL subframes other than UL subframes. Therefore, the HARQ-ACK of certain PDSCH transmitted in the last frame of the previous UL-DL configuration cannot be reported in the first frame of the current configuration during the UL-DL reconfiguration.

Figure 9:
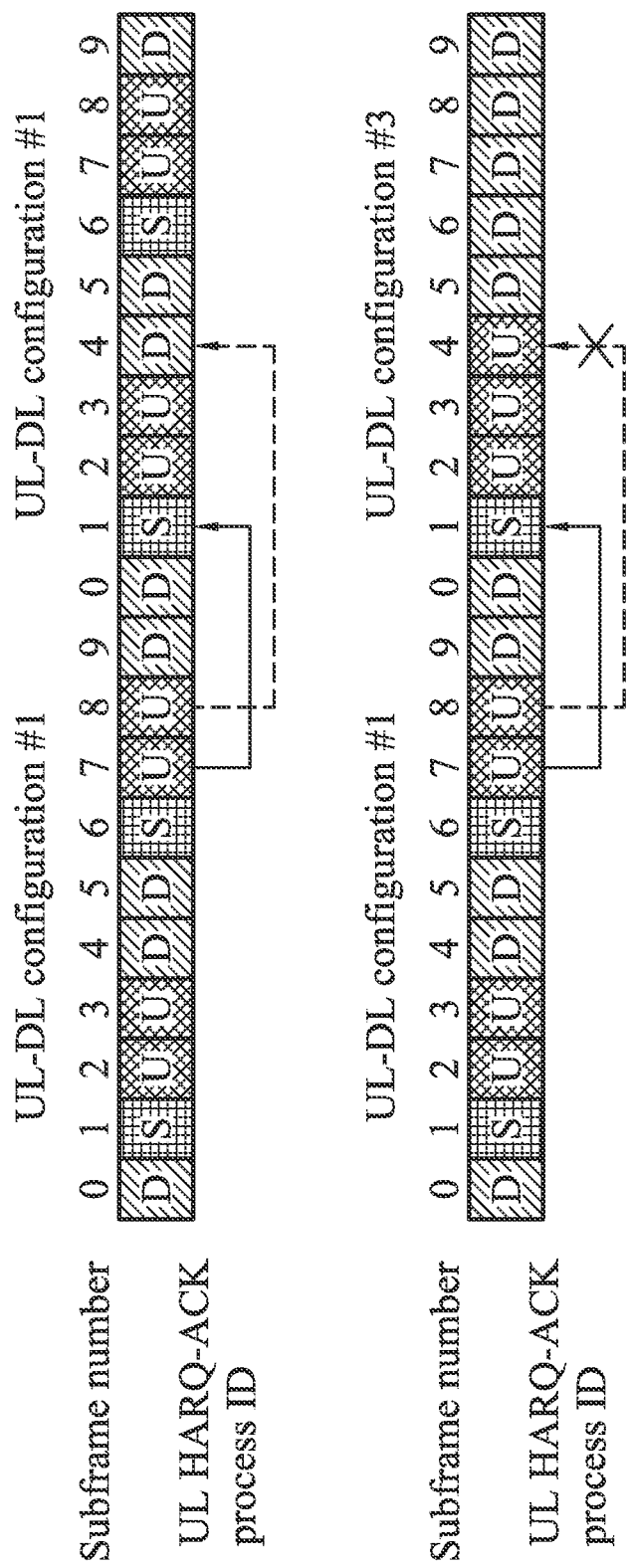
FIG. 9 is an example illustrating that the existing UL HARQ-ACK timing is not available during the UL-DL reconfiguration.

FIG. 9 is an example illustrating that the existing UL HARQ-ACK timing is unavailable during the UL-DL reconfiguration. When the UL-DL configuration is reconfigured from #1 to #3, a HARQ-ACK of the PUSCH transmitted in the subframe #8 should be transmitted in the subframe #4 of the next frame if the existing UL HARQ-ACK timing of the UL-DL configuration #1 is followed. However, the subframes #4 of the UL-DL configuration #2 is a UL subframe other than DL subframe. Therefore, the HARQ-ACK of certain PUSCH transmitted in the last frame of the previous UL-DL configuration cannot be transmitted in the first frame of the current configuration during the UL-DL reconfiguration.

Figure 10:
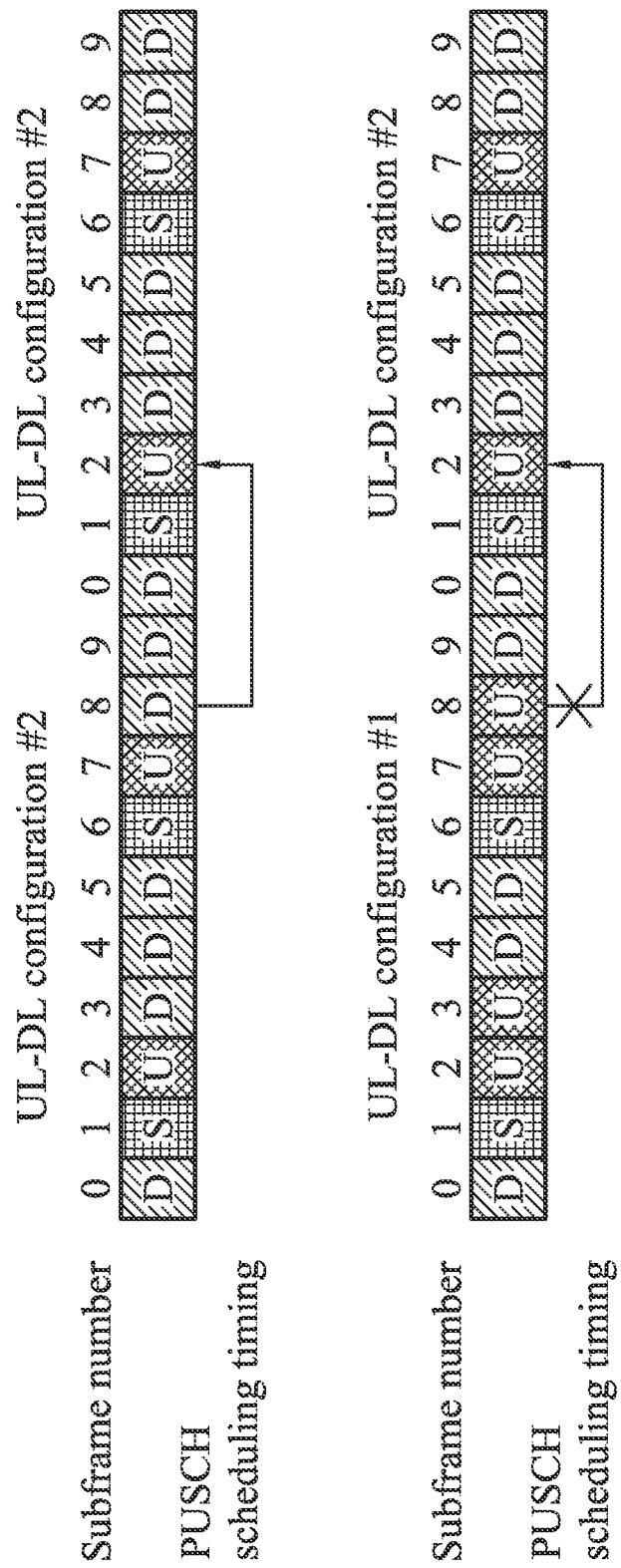
FIG. 10 is an example illustrating that the existing PUSCH scheduling timing is not available during the UL-DL reconfiguration.

FIG. 10 is an example illustrating that the existing PUSCH UL scheduling timing is unavailable during the UL-DL reconfiguration. When the UL-DL configuration is reconfigured from #1 to #2, a PUSCH transmitted in the next subframe #2 should be scheduled by the UL grant transmitted in the subframe #8 if the existing UL HARQ-ACK timing of the UL-DL configuration #1 is followed. However, the subframes #8 of the UL-DL configuration #1 is a UL subframe other than a DL subframe. Therefore, certain PUSCH transmitted in the first frame of the current UL-DL configuration cannot be scheduled in the last frame of the previous UL-DL configuration.

Based on the analysis described above, when the UL-DL configuration is changed, the existing HARQ timing may be unavailable. Therefore, it is necessary to design a new HARQ timing. The new HARQ timing is mainly used for the first frame of the current UL-DL configuration, and the other frames still follows the existing HARQ timing of the current UL-DL configuration.

TABLE 5 is an existing DL HARQ-ACK timing, the DL HARQ-ACK transmitted in the subframe n corresponds to the PDSCH transmitted in the subframe n−k, k∈K, wherein the size of the set K is M=1, 2, 3, 4, 9, indicating the numbers of the DL subframes associated with the same DL HARQ-ACK feedback subframe.

When the UL-DL configuration is changed, the last frame and the frames before the last frame of the previous UL-DL configuration can follow the existing DL HARQ-ACK timing of the previous UL-DL configuration in TABLE 5, and the second frame and the frames after the second frame of the current UL-DL configuration can follow the existing DL HARQ-ACK timing of the current UL-DL configuration in TABLE 5. But the first frame of the current UL-DL configuration follows a new DL HARQ-ACK timing, the new DL HARQ-ACK timing can be different from the existing timing of the previous UL-DL configuration and the existing timing of the current UL-DL configuration. TABLEs 6~12 show the examples of the new DL HARQ-ACK timing which can be used for the first frame of the current UL-DL configuration during UL-DL reconfiguration.

To design the new DL HARQ-ACK timing described in TABLEs 6~12, the following rules should be observed specifically:

When the PDSCH is received in the previous UL-DL configuration, the corresponding DL HARQ-ACK timing of the previous UL-DL configuration in TABLE 5 may be reused. In some cases, the DL HARQ-ACK timing of the previous UL-DL configuration cannot be reused. For example, the DL HARQ-ACK feedback subframe of the previous UL-DL configuration is unavailable under the current UL-DL configuration, i.e., it is actually a DL subframe in the current UL-DL configuration. Thus, another DL HARQ-ACK feedback subframe can be selected, and it is the closest to the associated PDSCH subframe. And, the interval between the selected DL HARQ-ACK subframe and the associated PDSCH subframe is at least 4 subframes.

When the PDSCH is received in the previous UL-DL configuration, the DL HARQ-ACK timing in the current UL-DL configuration of TABLE 5 can be at least partially reused.

Based on the above rules, for the new DL HARQ-ACK timing during UL-DL reconfiguration, most of timing tables can be generated according to the existing DL HARQ-ACK timing of the previous UL-DL configuration and the existing DL HARQ-ACK timing of the current UL-DL configuration. In other words, the first half of the timing table is similar to the previous UL-DL configuration, and the latter half of the timing table is similar to the current UL-DL configuration. A new DL HARQ-ACK timings and the number of bundled/reused subframes M can be used. For example, when the UL-DL configuration is changed from #3 to #5, M=5, and when the UL-DL configuration is changed from #3 to #5, M =7. In TABLE 5, the value of M can be M =1, 2, 3, 4, 9, wherein two methods of transmission, i.e ACK-NACK bundling and multiplexing, can be used when M =1, 2, 3, 4. The ACK-NACK bundling can be used only when M =9. For the increased M =5, 7, the existing ACK-NACK bundling transmission can be reused as M =9.

TABLE 5

DL HARQ-ACK timing table, K:{$k_0, k_1, \ldots, k_{M-1}$}

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 6 the current UL-DL configuration #0

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | — | — | 7, 6 | 4 | 4 | — | — | 6 | 4 | 4 |
| 2 | — | — | 8, 7, 4, 6 | 4 | 4 | — | — | 6 | — | 4 |
| 3 | — | — | 7, 6, 11 | 6, 5 | 5, 4 | — | — | 6 | — | 4 |
| 4 | — | — | 12, 8, 7, 11 | 6, 5, 4, 7 | 4 | — | — | 6 | — | 4 |
| 5 | — | — | 13, 12, 9, 8, 7, 5, 4, 11, 6 | 4 | 4 | — | — | 6 | — | 4 |
| 6 | — | — | 7 | 7 | 5 | — | — | 7 | 7 | 4 |

TABLE 7 the current UL-DL configuration is #1

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 7, 6 | 4 | — |
| 2 | — | — | 8, 7, 4, 6 | 4 | — | — | — | 7, 6 | 4 | — |
| 3 | — | — | 7, 6, 11 | 6, 5, 4 | — | — | — | 7, 6 | 4 | — |
| 4 | — | — | 12, 8, 7, 11 | 6, 5, 4, 7 | — | — | — | 7, 6 | 4 | — |
| 5 | — | — | 13, 12, 9, 8, 7, 5, 4, 11, 6 | 4 | — | — | — | 7, 6 | 4 | — |
| 6 | — | — | 7, 6 | 4 | — | — | — | 7, 6 | 4 | — |

TABLE 8 the current UL-DL configuration is #2

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | 7, 6, 4 | — | — |
| 1 | — | — | 7, 6 | — | — | — | — | 8, 7, 4, 6 | — | — |

TABLE 8-continued the current UL-DL configuration is #2

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | — | — | — | — | 8, 7, 4, 6 | — | — |
| 4 | — | — | 12, 8, 7, 11 | — | — | — | — | 8, 7, 4, 6 | — | — |
| 5 | — | — | 13, 12, 9, 8, 7, 5, 4, 11, 6 | — | — | — | — | 8, 7, 4, 6 | — | — |
| 6 | — | — | 7, 6 | — | — | — | — | 8, 7, 4, 6 | — | — |

TABLE 9 the current UL-DL configuration is #3

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | — | — | — |
| 1 | — | — | 7, 6 | 4 | 4 | — | — | — | — | — |
| 2 | — | — | 8, 7, 4, 6 | 4 | 4 | — | — | — | — | — |
| 4 | — | — | 12, 8, 7, 11 | 6, 5, 4, 7 | 4 | — | — | — | — | — |
| 5 | — | — | 13, 12, 9, 8, 7, 5, 4, 11, 6 | 4 | 4 | — | — | — | — | — |
| 6 | — | — | 7 | 7 | 5, 4 | — | — | 7 | 7 | — |

TABLE 10 the current UL-DL configuration is #4

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | — | — | — |
| 1 | — | — | 7, 6 | 4 | — | — | — | — | — | — |
| 2 | — | — | 8, 7, 4, 6 | 4 | — | — | — | — | — | — |
| 3 | — | — | 7, 6, 11 | 6, 5, 4 | — | — | — | — | — | — |
| 5 | — | — | 13, 12, 9, 8, 7, 5, 4, 11, 6 | 4 | — | — | — | — | — | — |
| 6 | — | — | 7 | 4, 7 | — | — | — | — | — | — |

TABLE 11 the current UL-DL configuration is #5

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | — | — | — |
| 1 | — | — | 7, 6 | — | — | — | — | — | — | — |
| 2 | — | — | 8, 7, 4, 6 | — | — | — | — | — | — | — |
| 3 | — | — | 7, 5, 4, 11, 6 | — | — | — | — | — | — | — |

TABLE 11-continued the current UL-DL configuration is #5

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 5, 4, 11, 6 | — | — | — | — | — | — | — |
| 6 | — | — | 7, 6 | — | — | — | — | — | — | — |

TABLE 12 the current UL-DL configuration is #6

| Previous UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | 7 | 7 | — |
| 1 | — | — | 7 | 7 | 5 | — | — | 7 | 7 | — |
| 2 | — | — | 8, 7, 4, 6 | 4 | — | — | — | 7 | 7 | — |
| 3 | — | — | 7, 6, 11 | 6, 5 | 5 | — | — | 7 | 7 | — |
| 4 | — | — | 12, 8, 7, 11 | 6, 5, 4, 7 | — | — | — | 7 | 7 | — |
| 5 | — | — | 13, 12, 9, 8, 7, 5, 4, 11, 6 | — | 4 | — | — | 7 | 7 | — |

TABLE 13 is an existing UL HARQ-ACK timing, wherein the UL HARQ-ACK transmitted in subframe n corresponds to the PUSCH transmitted in the subframe n−$K_{PHICH}$. For the UL-DL configuration #0, when a PHICH is received in the subframe #0 or the subframe #5 with a PHICH resource corresponding to $I_{PHICH}=0$, $K_{PHICH}=7$. Otherwise, $K_{PHICH}=6$.

When the UL-DL configuration is changed, the last frame and the frames before the last frame of the current UL-DL configuration can follow the existing UL HARQ-ACK timing of the current UL-DL configuration in TABLE 13. But the first frame of the current UL-DL configuration follows a new UL HARQ-ACK timing, and the new UL HARQ-ACK timing can be different from the existing UL HARQ-ACK timing of the previous UL-DL configuration and the existing UL HARQ-ACK timing of the current UL-DL configuration in TABLE 13. TABLEs 14~20 show the examples of the new UL HARQ-ACK timing which can be used for the first frame of the current UL-DL configuration during UL-DL reconfiguration.

To design the new UL HARQ-ACK timing described in TABLEs 14~20, the following rules should be observed specifically:

When the PUSCH is received in the previous UL-DL configuration, the corresponding UL HARQ-ACK timing of the previous UL-DL configuration in TABLE 5 may be reused. In some cases, the UL HARQ-ACK timing of the previous UL-DL configuration cannot be reused. For example, the corresponding UL HARQ-ACK feedback subframe of the previous UL-DL configuration is unavailable under the current UL-DL configuration, i.e. it is actually a UL subframe of the current UL-DL configuration. Thus, another UL HARQ-ACK feedback subframe can be selected, and it is the closest to the unavailable UL HARQ-ACK feedback subframe of the previous UL-DL configuration. And, the interval between the selected UL HARQ- ACK feedback subframe and the associated PUSCH subframe is at least 4 subframes.

When the PUSCH is received in the current UL-DL configuration, the UL HARQ-ACK timing of the current UL-DL configuration in TABLE 5 can be at least partially reused.

Based on the above rules, for the new UL HARQ-ACK timing, most of timing tables can be generated according to the existing UL HARQ-ACK timing of the previous UL-DL configuration and the existing UL HARQ-ACK timing of the current UL-DL configuration. In other words, the first half of the timing table is similar to the previous UL-DL configuration, and the latter half of the timing table is similar to the current UL-DL configuration. A new UL HARQ-ACK timing can also be used. For example, in TABLE 16, when the UL-DL configuration is changed from #2 to #5, $K_{PHICH}$ of the subframe #8 is 8 ($K_{PHICH}$=8). That is to say, the PHICH received in the subframe #8 corresponds to the PUSCH transmitted in the subframe #0. The UL HARQ-ACK timing table is different from the existing UL HARQ-ACK timing table.

TABLE 13

UL HARQ-ACK timing table, $K_{PHICH}$

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 7/6 | 4 | — | — | — | 7/6 | 4 | — | — | — |
| 1 | — | 4 | — | — | 6 | — | 4 | — | — | 6 |
| 2 | — | — | — | 6 | — | — | — | — | 6 | — |
| 3 | 6 | — | — | — | — | — | — | — | 6 | 6 |
| 4 | — | — | — | — | — | — | — | — | 6 | 6 |
| 5 | — | — | — | — | — | — | — | — | 6 | — |
| 6 | 6 | — | — | — | — | 7 | 4 | — | — | 6 |

TABLE 14 the previous UL-DL configuration is #0

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | 7/6 | 4 | — | — | 6 | 6 | 4 | — | — | 6 |
| 2 | 7/6 | 4 | — | 5 | — | 6 | — | — | 6 | — |
| 3 | 7/6 | 4 | — | — | — | 7 | 7 | — | 6 | 6 |
| 4 | 7/6 | 4 | — | — | — | 7 | 7 | — | 6 | 6 |
| 5 | 7/6 | 4 | — | — | — | 7/6 | — | — | 6 | — |
| 6 | 7/6 | 4 | — | — | — | 7/6 | 4 | — | — | 6 |

TABLE 15 the previous UL-DL configuration is #1

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | 4 | — | — | — | 7 | 4 | — | — | — |
| 2 | — | 4 | — | 5 | — | — | — | — | 6 | — |
| 3 | — | 4 | — | — | — | 7 | — | — | 6 | 6 |
| 4 | — | 4 | — | — | 6 | — | — | — | 6 | 6 |
| 5 | — | 4 | — | — | 6 | — | — | — | 6 | — |
| 6 | — | 4 | — | — | — | 7 | 4 | — | — | 6 |

TABLE 16 the previous UL-DL configuration is #2

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | 4 | — | — | — | — | 4 | — | — | — |
| 1 | — | 4 | — | — | — | — | 4 | — | — | 6 |
| 3 | — | 4 | — | — | — | — | — | — | 6 | 6 |
| 4 | — | 4 | — | — | — | — | — | — | 6 | 6 |
| 5 | — | — | — | 6 | — | — | — | — | 8 | — |
| 6 | — | 4 | — | — | — | — | 4 | — | — | 6 |

TABLE 17 the previous UL-DL configuration is #3

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 6 | — | — | — | — | — | 4 | — | — | — |
| 1 | 6 | — | — | — | — | — | 4 | — | — | 6 |
| 2 | 6 | — | — | — | — | — | — | — | 6 | — |
| 4 | 6 | — | — | — | — | — | — | — | 6 | 6 |
| 5 | 6 | — | — | — | — | — | — | — | 6 | — |
| 6 | 6 | — | — | — | — | — | 6 | — | — | 6 |

TABLE 18 the previous UL-DL configuration is #4

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | — | — | — | — | 4 | — | — | — |
| 1 | — | — | — | — | — | — | 4 | — | — | 6 |
| 2 | — | — | — | — | — | — | — | — | 6 | — |
| 3 | — | — | — | — | — | — | — | — | 6 | 6 |
| 5 | — | — | — | — | — | — | — | — | 6 | — |
| 6 | — | — | — | — | — | — | 4 | — | — | 6 |

TABLE 19 the previous UL-DL configuration is #5

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | — | — | — | — | 4 | — | — | — |
| 1 | — | — | — | — | — | — | 4 | — | — | 6 |
| 2 | — | — | — | — | — | — | — | — | 6 | — |
| 3 | — | — | — | — | — | — | — | — | 6 | 6 |
| 4 | — | — | — | — | — | — | — | — | 6 | 6 |
| 6 | — | — | — | — | — | — | 4 | — | — | 6 |

TABLE 20 the previous UL-DL configuration is #6

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 6 | 4 | — | — | — | 7 | 4 | — | — | — |
| 1 | 6 | 4 | — | — | 6 | — | 4 | — | — | 6 |
| 2 | 6 | 4 | — | 5 | — | — | — | — | 6 | — |

TABLE 20-continued the previous UL-DL configuration is #6

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | 6 | 4 | — | — | — | 7 | — | — | 6 | 6 |
| 4 | 6 | 4 | — | — | — | 7 | — | — | 6 | 6 |
| 5 | 6 | 4 | — | — | — | 7 | — | — | 6 | — |

TABLE 21 is an existing PUSCH scheduling timing, wherein the PUSCH transmitted in subframe n corresponds to the UL grant or the PHICH, i.e. UL HARQ-ACK detected in the subframe n–$K_{PUSCH}$. For the UL-DL configuration #0, when the LSB of the UL index in the UL grant corresponding to the PUSCHs transmitted in the subframe #2 and the subframe #7 are set to 1, $K_{PUSCH}$=7. Otherwise, $K_{PUSCH}$=6.

When the UL-DL configuration is changed, the last frame and the frames before the last frame of the previous UL-DL configuration can follow the corresponding PUSCH scheduling timing of previous UL-DL configuration in TABLE 21. But the first frame of the current UL-DL configuration follows a new PUSCH scheduling timing, the new PUSCH scheduling timing can be different from the existing PUSCH scheduling timing of the previous UL-DL configuration and the existing PUSCH scheduling timing of the current UL-DL configuration of TABLE 21. TABLEs 22~28 show the examples of the new PUSCH scheduling timing which can be used for the first frame of the current UL-DL configuration during UL-DL reconfiguration.

To design the new PUSCH scheduling timing described in TABLEs 22~28, the following rules should be observed specifically:

When a UL grant is transmitted in the previous UL-DL configuration and it is used for a continuous UL HARQ process, the PUSCH scheduling timing of the previous UL-DL configuration or the PUSCH scheduling timing of the current UL-DL configuration can be reused for the new PUSCH scheduling timing. When the PUSCH scheduling timing of the previous UL-DL configuration or the PUSCH scheduling timing of the current UL-DL configuration cannot be reused for the new PUSCH scheduling timing, e.g., the corresponding UL scheduling subframe of the current UL-DL configuration is unavailable under the previous UL-DL configuration, other PUSCH scheduling timings can be used. The new UL scheduling timing can be close to the existing PUSCH scheduling timing, i.e. the value of new $K_{PUSCH}$ is close to the value of the existing $K_{PUSCH}$.

When a UL grant is transmitted in the previous UL-DL configuration and it is used for an increased UL HARQ process, the UL grant may be as close as possible to the associated PUSCH, and the interval between the UL grant and the associated PUSCH is at least 4 subframes. When the UL grant is transmitted in the current UL-DL configuration, the PUSCH scheduling timing of the current UL-DL configuration can be at least partially reused.

Based on the above rules, for the new PUSCH scheduling timing during UL-DL reconfiguration, most of timing tables can be generated according to the existing PUSCH scheduling timing of the previous UL-DL configuration and the existing PUSCH scheduling timing of the current UL-DL configuration. In other words, the first half of the PUSCH scheduling timing is similar to the timing of the previous UL-DL configuration, and the latter half of the PUSCH scheduling timing is similar to the timing of the current UL-DL configuration. Different PUSCH scheduling timing may also be used. For example, in TABLE 26, when the UL-DL configuration is changed from #4 to #2, $K_{PUSCH}$ of the subframe #7 is 8 ($K_{PUSCH}$=8). This means the PUSCH received in the subframe #7 is scheduled in the subframe #9 of the previous frame. The PUSCH scheduling timing table is different from the existing PUSCH scheduling timing table.

TABLE 21

PUSCH scheduling timing, $K_{PUSCH}$

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6/7 | 7 | 4 | — | — | 6/7 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 22 the previous UL-DL configuration is #0

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | — | — | 6/7 | 7 | — | — | — | 6 | 4 | — |
| 2 | — | — | 6/7 | — | — | — | — | 4 | — | — |
| 3 | — | — | 6/7 | 7 | 4 | — | — | — | — | — |
| 4 | — | — | 6/7 | 7 | — | — | — | — | — | — |
| 5 | — | — | 6/7 | — | — | — | — | — | — | — |
| 6 | — | — | 6/7 | 7 | 4 | — | — | 6/7 | 7 | — |

TABLE 23 the previous UL-DL configuration is #1

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 4 | 4 | — | — | 6/7 | 7 | 4 |
| 2 | — | — | 6 | — | — | — | — | 4 | — | — |
| 3 | — | — | 6 | 4 | 4 | — | — | — | — | — |
| 4 | — | — | 6 | 4 | — | — | — | — | — | — |
| 5 | — | — | 6 | — | — | — | — | — | — | — |
| 6 | — | — | 7 | 7 | 5 | — | — | 7 | 7 | — |

TABLE 24 the previous UL-DL configuration is #2

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 4 | 4 | — | — | 6/7 | 7 | 4 |
| 1 | — | — | 4 | 4 | — | — | — | 6 | 4 | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 6 | 5 | 5 | — | — | 7 | 7 | — |

TABLE 25 the previous UL-DL configuration is #3

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 4 | 4 | — | — | 6/7 | 7 | 4 |
| 1 | — | — | 4 | 4 | — | — | — | 7 | 4 | — |
| 2 | — | — | 4 | — | — | — | — | 7 | — | — |
| 4 | — | — | 4 | 4 | — | — | — | — | — | — |
| 5 | — | — | 4 | — | — | — | — | — | — | — |
| 6 | — | — | 5 | 5 | 5 | — | — | 7 | 7 | — |

TABLE 26 the previous UL-DL configuration is #4

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 4 | — | — | — | 6/7 | 7 | 4 |
| 1 | — | — | 4 | 4 | — | — | — | 6 | 4 | — |
| 2 | — | — | 4 | — | — | — | — | 8 | — | — |
| 3 | — | — | 4 | 4 | 4 | — | — | — | — | — |
| 5 | — | — | 4 | — | — | — | — | — | — | — |
| 6 | — | — | 5 | 5 | 5 | — | — | 7 | 7 | — |

TABLE 27 the previous UL-DL configuration is #5

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 4 | 4 | — | — | 6/7 | 7 | 4 |
| 1 | — | — | 4 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 6 | — | — | 5 | 5 | 5 | — | — | 7 | 7 | — |

TABLE 28 the previous UL-DL configuration is #6

| Current UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 7 | 7 | 5 | — | — | 6/7 | 7 | 4 |
| 1 | — | — | 7 | 7 | — | — | — | 6 | 4 | — |
| 2 | — | — | 7 | — | — | — | — | 4 | — | — |
| 3 | — | — | 7 | 7 | 5 | — | — | — | — | — |
| 4 | — | — | 7 | 7 | — | — | — | — | — | — |
| 5 | — | — | 7 | — | — | — | — | — | — | — |

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects, concurrent channels may be established based on pulse repetition frequencies. In some aspects concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while subsequent within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for determining a HARQ-ACK feedback timing and a uplink scheduling timing during UL-DL reconfiguration, the method comprising:
   using, by a user equipment (UE), a first timing set for a HARQ-ACK feedback timing and a UL scheduling timing of a first frame of a current UL-DL configuration during the UL-DL reconfiguration; and
   using, by the UE, a second timing set for the HARQ-ACK feedback timing and a UL scheduling timing of a second frame and subsequent frames of the current UL-DL configuration after the UL-DL reconfiguration;
   wherein the first timing set is different from the second timing set and a third timing set for a HARQ-ACK feedback timing and a UL scheduling timing of a previous UL-DL configuration before the UL-DL reconfiguration.

2. The method as claimed in claim 1, wherein the HARQ-ACK feedback timing is a UL HARQ-ACK feedback timing or a DL HARQ-ACK feedback timing.

3. The method as claimed in claim 1, wherein the UL scheduling timing is a timing of a physical uplink shared channel scheduled by an uplink grant, or a timing of a physical uplink shared channel scheduled by a HARQ-ACK.

4. The method as claimed in claim 2, wherein the HARQ-ACK feedback timing is a UL HARQ-ACK feedback timing, the method further comprises:
   starting a first number of HARQ processes when a number of HARQ processes of the current UL-DL configuration is greater than a number of HARQ processes of a previous UL-DL configuration; or
   terminating a second number of HARQ processes when the number of HARQ processes of the current UL-DL configuration is less than the number of HARQ processes of the previous UL-DL configuration; or
   terminating a third number of HARQ processes and starting the third number of HARQ processes when the number of HARQ processes of the current UL-DL configuration is equal to the number of HARQ processes of the previous UL-DL configuration, and certain HARQ processes are unable to be continuous during the UL-DL reconfiguration.

5. The method as claimed in claim 4, wherein the UE further activates the first number of HARQ modules and the first number of buffers when starting the first number of HARQ processes.

6. The method as claimed in claim 4, wherein the UE further clears the second number of buffers corresponding to the second number of terminated HARQ process when terminating the second number of HARQ processes.

7. The method as claimed in claim 4, wherein the HARQ process is terminated after receiving the last HARQ-ACK of the terminated HARQ process.

8. The method as claimed in claim 6, further comprising:
   when the last HARQ-ACK of the terminated HARQ process is a negative acknowledgement (NACK), and a number of the retransmissions of the terminated HARQ process is less than a maximum number of retransmissions, an uncoded data corresponding to the terminated HARQ process is included in other activated HARQ process as new data transmission; and
   when the number of retransmissions of the terminated HARQ process is equal to a maximum number of retransmissions, or the last HARQ-ACK of the terminated HARQ process is a positive acknowledgement (ACK), a coded data corresponding to the terminated HARQ process are cleared from the corresponding buffers.

9. The method as claimed in claim 7, further comprising:
   when the last HARQ-ACK of the HARQ process is NACK, and a number of retransmissions of the terminated HARQ process is less than a maximum number of transmissions, a coded data corresponding to the terminated HARQ process is included in other activated HARQ processes and is retransmitted in the other activated HARQ processes; and
   when the number of retransmissions of the terminated HARQ process is equal to a maximum number of retransmissions, or the last HARQ-ACK of the terminated HARQ process is ACK, the coded data corresponding to the terminated HARQ process are cleared from the corresponding buffers.

10. The method as claimed in claim 9, wherein there is a mapping relationship between the terminated HARQ process and the other activated HARQ process.

11. The method as claimed in claim 10, wherein the mapping relationship is configured by a radio resource control (RRC) signaling.

12. The method as claimed in claim 9, wherein a priority of the retransmission of the terminated HARQ process and the retransmission of the activated HARQ process mapped to the terminated HARQ process is configured by RRC signaling.

13. The method as claimed in claim 9, wherein the retransmission of the terminated HARQ process and the retransmission of the activated HARQ process mapped to the terminated HARQ process are indicated by physical signaling.

14. The method as claimed in claim 13, wherein the UE detects a DL control message to obtain that the retransmitted data in the activated HARQ processes is mapped to the terminated HARQ process or the activated HARQ processes.

15. The method as claimed in claim 1, further comprising:
the HARQ-ACK feedback timing of a first frame of the current UL-DL configuration is generated from the HARQ-ACK feedback timing of the previous UL-DL configuration and the HARQ-ACK feedback timing of the current UL-DL configuration; and
the UL scheduling timing of the first frame of the current UL-DL configuration is generated from the UL scheduling timing of the previous UL-DL configuration, and the UL scheduling timing of the current UL-DL configuration.

16. The method as claimed in claim 15, wherein in the step in which the HARQ-ACK feedback timing of the first frame of the current UL-DL configuration is generated from the HARQ-ACK feedback timing of the previous UL-DL configuration and the HARQ-ACK feedback timing of the current UL-DL configuration further comprises:
a HARQ-ACK feedback subframe is available under the current UL-DL configuration when reusing the HARQ-ACK feedback timing of the previous UL-DL configuration, at least the generated HARQ-ACK feedback timing partially reuses the available HARQ-ACK feedback timing of the previous UL-DL configuration;
a HARQ-ACK feedback subframe is unavailable under the current UL-DL configuration when reusing the HARQ-ACK feedback timing of the previous UL-DL configuration, a specific subframe of the current UL-DL configuration is selected to transmit the HARQ-ACK feedback,
wherein the specific subframe is a closest subframe of the unavailable HARQ-ACK feedback subframe when reusing the HARQ-ACK feedback timing of the previous UL-DL configuration, and an interval between a transmission subframe for corresponding physical shared data channel and the selected subframe is at least 4 subframes.

17. The method as claimed in claim 15, wherein in the step in which the UL scheduling timing of the first frame of the current UL-DL configuration is generated from the UL scheduling timing of the previous UL-DL configuration and the UL scheduling timing of the current UL-DL configuration further comprises:
a UL scheduling subframe is available under the previous UL-DL configuration when reusing the UL timing of the current UL-DL configuration, at least the generated UL scheduling timing partially reuses the available UL scheduling timing of the current UL-DL configuration;
a UL scheduling subframe is unavailable under the previous UL-DL configuration when reusing the UL scheduling timing of the current UL-DL configuration, a specific subframe of the previous UL-DL configuration is selected to transmit the UL scheduling,
wherein the specific subframe is a closest subframe of the unavailable UL scheduling subframe when reusing the UL scheduling timing of the current UL-DL configuration, and an interval between a transmission subframe for corresponding physical shared data channel and the selected subframe is at least 4 subframes.

18. A user equipment (UE) for managing a HARQ-ACK feedback timing during UL-DL reconfiguration, comprising:
a plurality of buffers, buffering a first transmission and retransmission of a physical shared data channel;
at least one processing circuit;
when an uplink-downlink (UL-DL) configuration is reconfigured, the processing circuit being configured for,
using a first timing table for HARQ-ACK feedback timing of a first frame of a current UL-DL configuration;
using a second timing table for HARQ-ACK feedback timing of a second frame and subsequent frames of the current UL-DL configuration after the UL-DL reconfiguration; and
transmitting the HARQ-ACK corresponding to the physical shared data according to the corresponding HARQ-ACK feedback timing table;
wherein the first timing set is different from the second timing set and a third timing set for a HARQ-ACK feedback timing and a UL scheduling timing of a previous UL-DL configuration before the UL-DL reconfiguration.

19. The user equipment for managing a HARQ-ACK feedback timing during UL-DL reconfiguration as claimed in claim 18, wherein the HARQ-ACK feedback timing is an UL HARQ-ACK feedback timing or a DL HARQ-ACK feedback timing, the at least one processing circuit is further configured for:
starting a first number of HARQ processes when a number of HARQ processes of the current UL-DL configuration is greater than a number of HARQ processes of a previous UL-DL configuration; or
terminating a second number of HARQ processes when the number of HARQ processes of the current UL-DL configuration is less than the number of HARQ processes of the previous UL-DL configuration; or
terminating a third number of HARQ processes and starting the third number of HARQ processes when the number of HARQ processes of the current UL-DL configuration is equal to the number of HARQ processes of the previous UL-DL configuration, and certain HARQ processes are unable to be continuous during the UL-DL reconfiguration.

20. The user equipment for managing a HARQ-ACK feedback timing during UL-DL reconfiguration as claimed in claim 19, wherein the UE further activates the first number of buffers when starting the first number of HARQ processes.

21. The user equipment for managing a HARQ-ACK feedback timing during UL-DL reconfiguration as claimed in claim 19, wherein the UE further clears the second number of buffers corresponding to the second number of terminated HARQ processes when terminating the second number of HARQ processes.

22. The user equipment for managing a HARQ-ACK feedback timing during UL-DL reconfiguration as claimed in claim 21, further comprising:
when the last HARQ-ACK of the terminated HARQ process is NACK, and a number of the retransmissions of the terminated HARQ process is less than an allowed maximum number of retransmissions, an uncoded data corresponding to the terminated HARQ process is included in other activated HARQ process as new data transmission; and
when the number of retransmissions of the terminated HARQ process is equal to an allowed maximum number of retransmissions, or the corresponding HARQ-ACK is ACK, a coded data corresponding to the terminated HARQ process is cleared from the corresponding buffers.

23. The user equipment for managing a HARQ-ACK feedback timing during UL-DL reconfiguration as claimed in claim 18, wherein the at least one processing circuit is configured for generating the first timing table according to the following principles:
- at least the generated HARQ-ACK feedback timing partially reuses the HARQ-ACK feedback timing of the previous UL-DL configuration;
- a HARQ-ACK feedback subframe is unavailable under current UL-DL configuration when reusing the HARQ-ACK feedback timing of the previous UL-DL configuration, a specific subframe of the current UL-DL configuration is selected to transmit the specific HARQ-ACK feedback;
- wherein the specific subframe is a closest subframe of the unavailable HARQ-ACK feedback subframe when reusing the HARQ-ACK feedback timing of the previous UL-DL configuration, and an interval between a transmission subframe for corresponding physical shared data channel and the selected subframe is at least 4 subframes.

* * * * *